US012706624B2

(12) United States Patent
Regev et al.

(10) Patent No.: US 12,706,624 B2
(45) Date of Patent: Aug. 11, 2026

(54) TECHNIQUES FOR FREQUENCY BAND DISTORTION CORRECTION

(71) Applicant: QUALCOMM Incorporated, San Diego, CA (US)

(72) Inventors: Aviv Regev, Tel Aviv (IL); Ronen Shaked, Kfar Saba (IL); Amit Moses, Tel Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 347 days.

(21) Appl. No.: 18/514,806

(22) Filed: Nov. 20, 2023

(65) Prior Publication Data

US 2025/0167820 A1 May 22, 2025

(51) Int. Cl.
*H04B 1/12* (2006.01)
*H04B 17/336* (2015.01)

(52) U.S. Cl.
CPC ............. *H04B 1/12* (2013.01); *H04B 17/336* (2015.01)

(58) Field of Classification Search
CPC ................................ H04B 1/12; H04B 17/336
See application file for complete search history.

(56) References Cited

U.S. PATENT DOCUMENTS 11,799,541 B1 * 10/2023 Gutman ................ H04W 76/15
2017/0093458 A1 * 3/2017 Rafique .................... H04B 1/68
2020/0383119 A1 * 12/2020 Sun ..................... H04W 72/542
2022/0141064 A1 5/2022 Horn et al.
2023/0337026 A1 * 10/2023 Gutman .............. H04W 12/122
2024/0031085 A1 * 1/2024 Horn ...................... H04L 5/0048
2024/0080230 A1 * 3/2024 Shaked ................. H04L 27/364
2024/0430815 A1 * 12/2024 Regev .................. H04B 17/328

OTHER PUBLICATIONS

International Search Report and Written Opinion—PCT/US2024/050268—ISA/EPO—Jan. 30, 2025.

* cited by examiner

*Primary Examiner* — Junpeng Chen
(74) *Attorney, Agent, or Firm* — Holland & Hart LLP

(57) ABSTRACT

Methods, systems, and devices for wireless communications are described. A network entity may obtain from a user equipment (UE), a report that indicates one or more signal quality values associated with a set of communication chains of the UE. The network entity may perform a frequency domain residual sideband (FDRSB) identification procedure to determine an FDRSB correction table associated with a set of frequency bands and the set of communication chains. The network entity may output to the UE a control message indicating the FDRSB correction table that identifies which one or more frequency bands of the set of frequency bands and which one or more communication chains of the set of communication chains are associated with FDRSB correction. The UE may demodulate one or more messages via at least one communication chain of the set of communication chains based on FDRSB correction performed using the FDRSB correction table.

20 Claims, 17 Drawing Sheets

TECHNIQUES FOR FREQUENCY BAND DISTORTION CORRECTION

FIELD OF TECHNOLOGY

The following relates to wireless communications, including techniques for frequency band distortion correction.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for frequency band distortion correction. For example, the described techniques provide for a reduction in both frequency domain residual sideband (FDRSB) noise and power expenditure associated with FDRSB correction. For example, a user equipment (UE) may transmit to the network entity a control state information (CSI) report that indicates one or more signal quality values (e.g., a signal to noise ratio (SNR) value) associated with a set of communication chains used to communicate with the network entity. As such, the network entity may use the SNR value in accordance with an FDRSB identification procedure to determine an FDRSB correction table associated with a set of frequency bands and the set of communication chains. For example, as part of the FDRSB identification procedure, the network entity may determine a respective FDRSB distortion level for each communication chain (e.g., transmission chain) and use the respective FDRSB distortion level and the reported SNR value to determine the thermal noise level associated with the set of communication chains. In accordance with the thermal noise level and a modulation and coding scheme (MCS) operation level, the network entity may determine an error vector magnitude (EVM) threshold value. In some examples, the network entity may compare the FDRSB distortion level for a given transmission chain across the set of frequency bands, such that for frequency bands that the FDRSB distortion level is above the EVM threshold, the network entity may determine that correcting FDRSB for the corresponding communication chain may reduce noise.

Based on comparing the respective FDRSB distortion level for each transmission chain across the set of frequency bands, the network entity may generate the FDRSB correction table that indicates multiple indexes of frequency bands and which communication chains would benefit from FDRSB correction for each of the multiple indexes of frequency bands. The network entity may transmit to the UE a control message that indicates the FDRSB correction table. As such, the UE may use the FDRSB correction table to demodulate one or more data messages. For example, the UE may receive a data message across one or more frequency bands and may apply FDRSB correction on the communication chains indicated in the FDRSB correction table for each of the one or more frequency bands that carry the data message.

A method for wireless communications by a network entity is described. The method may include obtaining, from a UE, a CSI report that indicates one or more signal quality values associated with a set of communication chains of the UE, performing, based on the one or more signal quality values, a FDRSB identification procedure to determine an FDRSB correction table associated with a set of frequency bands and the set of communication chains, and outputting, to the UE, a control message indicating the FDRSB correction table that identifies which one or more frequency bands of the set of frequency bands and which one or more communication chains of the set of communication chains are associated with FDRSB correction.

A network entity for wireless communications is described. The network entity may include one or more memories storing processor executable code, and one or more processors coupled with the one or more memories. The one or more processors may individually or collectively operable to execute the code to cause the network entity to obtain, from a UE, a CSI report that indicates one or more signal quality values associated with a set of communication chains of the UE, perform, based on the one or more signal quality values, a FDRSB identification procedure to determine an FDRSB correction table associated with a set of frequency bands and the set of communication chains, and output, to the UE, a control message indicating the FDRSB correction table that identifies which one or more frequency bands of the set of frequency bands and which one or more communication chains of the set of communication chains are associated with FDRSB correction.

Another network entity for wireless communications is described. The network entity may include means for obtaining, from a UE, a CSI report that indicates one or more signal quality values associated with a set of communication chains of the UE, means for performing, based on the one or more signal quality values, a FDRSB identification procedure to determine an FDRSB correction table associated with a set of frequency bands and the set of communication chains, and means for outputting, to the UE, a control message indicating the FDRSB correction table that identifies which one or more frequency bands of the set of frequency bands and which one or more communication chains of the set of communication chains are associated with FDRSB correction.

A non-transitory computer-readable medium storing code for wireless communications is described. The code may include instructions executable by one or more processors to obtain, from a UE, a CSI report that indicates one or more signal quality values associated with a set of communication chains of the UE, perform, based on the one or more signal quality values, a FDRSB identification procedure to determine an FDRSB correction table associated with a set of frequency bands and the set of communication chains, and output, to the UE, a control message indicating the FDRSB correction table that identifies which one or more frequency bands of the set of frequency bands and which one or more communication chains of the set of communication chains are associated with FDRSB correction.

Some examples of the method, network entities, and non-transitory computer-readable medium described herein may further include operations, features, means, or instructions for obtaining, a capability message indicating that the UE may be capable of performing the FDRSB correction, where the FDRSB identification procedure and the control message indicating the FDRSB correction table may be based on the capability message.

In some examples of the method, network entities, and non-transitory computer-readable medium described herein, the FDRSB identification procedure may include operations, features, means, or instructions for measuring an FDRSB distortion level across the set of frequency bands for the set of communication chains and generating a respective FDRSB curve for each communication chain of the set of communication chains, where a given FDRSB curve includes an FDRSB value for each frequency band across the set of frequency bands for an associated communication chain.

Some examples of the method, network entities, and non-transitory computer-readable medium described herein may further include operations, features, means, or instructions for determining a thermal noise level across the set of frequency bands for the set of communication chains based on the FDRSB distortion level and the one or more signal quality values.

Some examples of the method, network entities, and non-transitory computer-readable medium described herein may further include operations, features, means, or instructions for determining a first value for a thermal noise threshold based on the thermal noise level across the set of frequency bands and a noise attenuation value associated with the network entity, determining a second value for a MCS threshold associated with decoding data MCSs at the network entity, and determining an EVM threshold as a higher value between the first value and the second value.

Some examples of the method, network entities, and non-transitory computer-readable medium described herein may further include operations, features, means, or instructions for determining the FDRSB correction table in accordance with the EVM threshold and the respective FDRSB curve for each communication chain, where the FDRSB correction table includes: a set of multiple subsets of frequency bands that spans the set of frequency bands; and a respective indication of one or more communication chains of the set of communication chains for each subset of frequency bands, where the one or more communication chains indicated for a given subset of frequency bands may be based on the FDRSB value associated with the one or more communication chains being greater than the EVM threshold for the given subset of frequency bands.

In some examples of the method, network entities, and non-transitory computer-readable medium described herein, the one or more signal quality values associated with the set of frequency bands includes a current SNR value at the UE associated with the set of communication chains.

In some examples of the method, network entities, and non-transitory computer-readable medium described herein, the control message indicating the FDRSB correction table may be a physical downlink control channel (PDCCH) message.

A method for wireless communications by a UE is described. The method may include transmitting, to a network entity, a CSI report that indicates one or more signal quality values associated with a set of communication chains of the UE, receiving, based on transmitting the CSI report, a control message indicating a FDRSB correction table that identifies which one or more frequency bands of a set of frequency bands and which one or more communication chains of the set of communication chains of the UE to apply FDRSB correction, and demodulating one or more messages via at least one communication chain of the set of communication chains based on FDRSB correction performed in accordance with the FDRSB correction table.

A UE for wireless communications is described. The UE may include one or more memories storing processor executable code, and one or more processors coupled with the one or more memories. The one or more processors may individually or collectively operable to execute the code to cause the UE to transmit, to a network entity, a CSI report that indicates one or more signal quality values associated with a set of communication chains of the UE, receive, based on transmitting the CSI report, a control message indicating a FDRSB correction table that identifies which one or more frequency bands of a set of frequency bands and which one or more communication chains of the set of communication chains of the UE to apply FDRSB correction, and demodulate one or more messages via at least one communication chain of the set of communication chains based on FDRSB correction performed in accordance with the FDRSB correction table.

Another UE for wireless communications is described. The UE may include means for transmitting, to a network entity, a CSI report that indicates one or more signal quality values associated with a set of communication chains of the UE, means for receiving, based on transmitting the CSI report, a control message indicating a FDRSB correction table that identifies which one or more frequency bands of a set of frequency bands and which one or more communication chains of the set of communication chains of the UE to apply FDRSB correction, and means for demodulating one or more messages via at least one communication chain of the set of communication chains based on FDRSB correction performed in accordance with the FDRSB correction table.

A non-transitory computer-readable medium storing code for wireless communications is described. The code may include instructions executable by one or more processors to transmit, to a network entity, a CSI report that indicates one or more signal quality values associated with a set of communication chains of the UE, receive, based on transmitting the CSI report, a control message indicating a FDRSB correction table that identifies which one or more frequency bands of a set of frequency bands and which one or more communication chains of the set of communication chains of the UE to apply FDRSB correction, and demodulate one or more messages via at least one communication chain of the set of communication chains based on FDRSB correction performed in accordance with the FDRSB correction table.

Some examples of the method, UEs, and non-transitory computer-readable medium described herein may further include operations, features, means, or instructions for transmitting, a capability message indicating that the UE may be capable of performing the FDRSB correction, where the control message indicating the FDRSB correction table may be based on the capability message.

In some examples of the method, UEs, and non-transitory computer-readable medium described herein, the FDRSB correction table includes: an indication of a set of multiple subsets of frequency bands that spans the set of frequency bands; and a respective indication of one or more communication chains of the set of communication chains for each subset of frequency bands.

In some examples of the method, UEs, and non-transitory computer-readable medium described herein, performing the FDRSB correction may include operations, features, means, or instructions for estimating a respective FDRSB level for each of the one or more communication chains indicated for each subset of frequency bands of the set of multiple subsets of the frequency bands and removing the estimated respective FDRSB level for each of the one or more communication chains indicated for each subset of frequency bands of the set of multiple subsets of the frequency bands.

In some examples of the method, UEs, and non-transitory computer-readable medium described herein, the one or more signal quality values associated with the set of frequency bands includes a current SNR value at the UE associated with the set of communication chains.

In some examples of the method, UEs, and non-transitory computer-readable medium described herein, the control message indicating the FDRSB correction table may be a PDCCH message.

DETAILED DESCRIPTION

Figure 1:
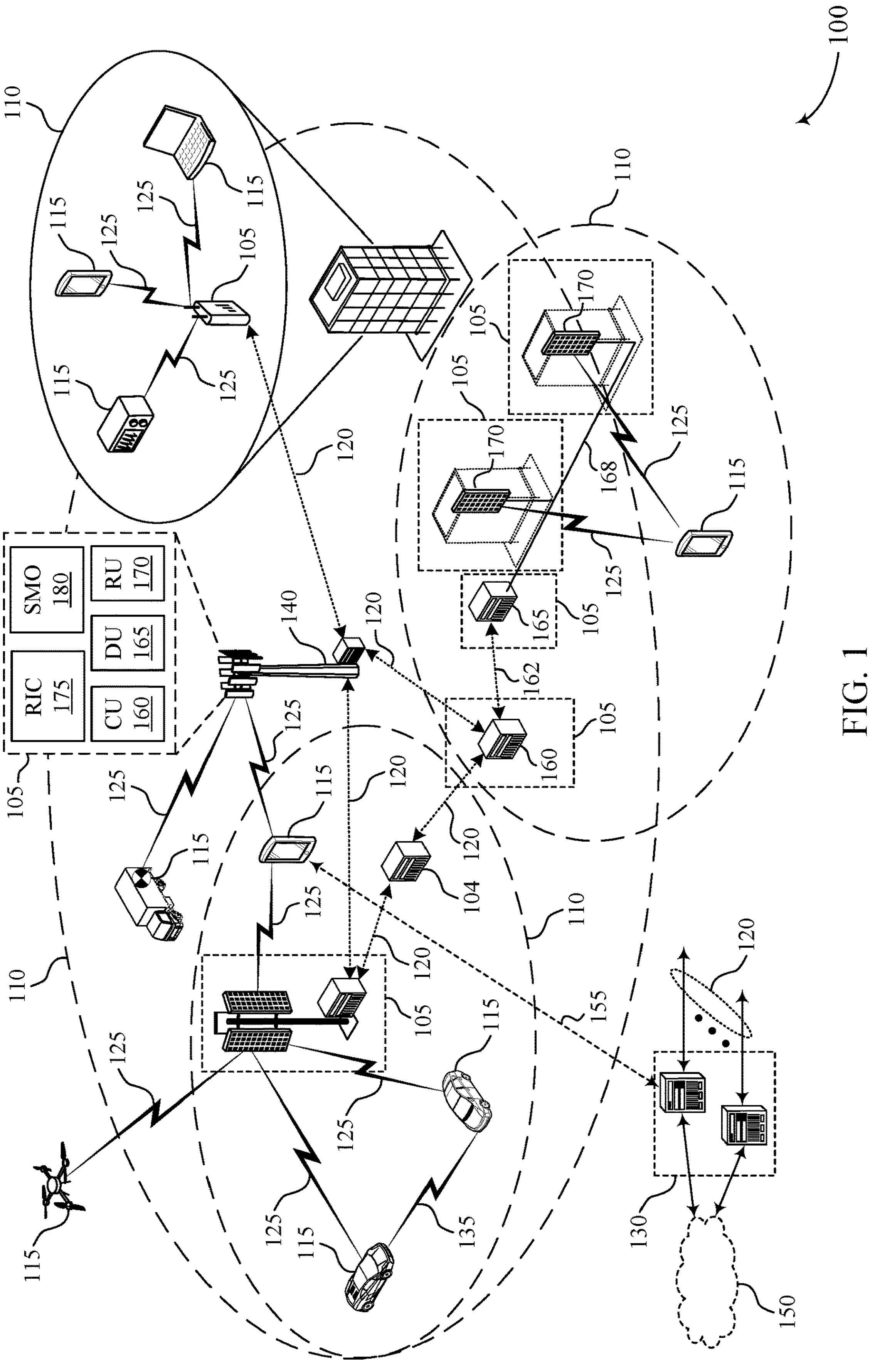
FIG. 1 shows an example of a wireless communications system that supports techniques for frequency band distortion correction in accordance with one or more aspects of the present disclosure.

In some examples of wireless communications, a network entity and a user equipment (UE) may communicate via a set of antennas that are associated with a set of communication chains. For example, the network entity and UE may use the communication chains to communicate data across a set of frequency bands (e.g., that spans a set of frequency carriers or frequency resource elements). In some cases, however, a given wireless communication may be associated with one or more types of types of interferences or impairments. For instance, the UE may experience frequency domain residual sideband (FDRSB) impairment when receiving a data message. In some examples, FDRSB impairment may be based on a non-synchronization between in-phase and quadrature mixers at the UE. In some cases, the UE may perform FDRSB correction to estimate and reduce noise caused by FDRSB. However, such a correction may increase digital power consumption and latency of a demodulator at the UE. Additionally, in some examples, cancellation of the FDRSB may not improve performance. For instance, if a data message is associated with additional types of noise that are greater than the FDRSB (e.g., thermal noise), then correcting FDRSB may incur energy expenditure of the UE but may not reduce the error associated with demodulating the data message (e.g., the final error vector magnitude (EVM)). Additionally, FDRSB noise may not be equal across different communication chains at different frequency bands. As such, FDRSB correction may improve performance for some frequency bands and may not improve performance for other frequency bands.

A network entity and a UE may reduce both FDRSB noise and power expenditure associated with FDRSB correction by operating in accordance with the techniques described herein. For example, the UE may transmit to the network entity a control state information (CSI) report that indicates one or more signal quality values (e.g., a signal to noise ratio (SNR) value) associated with a set of communication chains used to communicate with the network entity. As such, the network entity may use the SNR value in accordance with an FDRSB identification procedure to determine an FDRSB correction table associated with a set of frequency bands and the set of communication chains. For example, as part of the FDRSB identification procedure, the network entity may determine a respective FDRSB distortion level for each transmission chain and use the respective FDRSB distortion level and the reported SNR value to determine the thermal noise level associated with the set of communication chains. In accordance with the thermal noise level and a modulation and coding scheme (MCS) operation level, the network entity may determine an EVM threshold value. In some examples, the network entity may compare the FDRSB distortion level for a given transmission chain across the set of frequency bands, such that for frequency bands that the FDRSB distortion level is above the EVM threshold, the network entity may determine that correcting FDRSB for the corresponding communication chain may reduce noise.

Based on comparing the respective FDRSB distortion level for each transmission chain across the set of frequency bands, the network entity may generate the FDRSB correction table that indicates multiple indexes of frequency bands and which communication chains would benefit from FDRSB correction for each of the multiple indexes of frequency bands. The network entity may transmit to the UE a control message that indicates the FDRSB correction table. As such, the UE may use the FDRSB correction table to demodulate one or more data messages. For example, the UE may receive a data message across one or more frequency bands and may apply FDRSB correction on the communication chains indicated in the FDRSB correction table for each of the one or more frequency bands that carry the data message.

Aspects of the disclosure are initially described in the context of wireless communications systems, network architecture, an FDRSB identification procedure, and a process flow. Aspects of the disclosure are further illustrated by and described with reference to apparatus diagrams, system diagrams, and flowcharts that relate to techniques for frequency band distortion correction.

FIG. 1 shows an example of a wireless communications system 100 that supports techniques for frequency band distortion correction in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, anode of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for frequency band distortion correction as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

A network entity 105 and a UE 115 may reduce both FDRSB noise and power expenditure associated with FDRSB correction by operating in accordance with the techniques described herein. For example, the UE 115 may transmit to the network entity 105 a CSI report that indicates one or more signal quality values (e.g., an SNR value) associated with a set of communication chains used to communicate with the network entity 105. A communication chain may refer to circuitry for transmitting a message, receiving a message, or both, As such, the network entity 105 may use the SNR value in accordance with an FDRSB identification procedure to determine an FDRSB correction table associated with a set of frequency bands and the set of communication chains. For example, as part of the FDRSB identification procedure, the network entity 105 may determine a respective FDRSB distortion level for each transmission chain and use the respective FDRSB distortion level and the reported SNR value to determine the thermal noise level associated with the set of communication chains. In accordance with the thermal noise level and an MCS operation level, the network entity 105 may determine an EVM threshold value. In some examples, the network entity 105 may compare the FDRSB distortion level for a given transmission chain across the set of frequency bands, such that for frequency bands that the FDRSB distortion level is above the EVM threshold, the network entity 105 may determine that correcting FDRSB for the corresponding communication chain may reduce noise.

Based on comparing the respective FDRSB distortion level for each transmission chain across the set of frequency bands, the network entity 105 may generate the FDRSB correction table that indicates multiple indexes of frequency bands and which communication chains would benefit from FDRSB correction for each of the multiple indexes of frequency bands. The network entity 105 may transmit to the UE 115 a control message that indicates the FDRSB correction table. As such, the UE 115 may use the FDRSB correction table to demodulate one or more data messages. For example, the UE 115 may receive a data message across one or more frequency bands and may apply FDRSB correction on the communication chains indicated in the FDRSB correction table for each of the one or more frequency bands that carry the data message.

Figure 2:
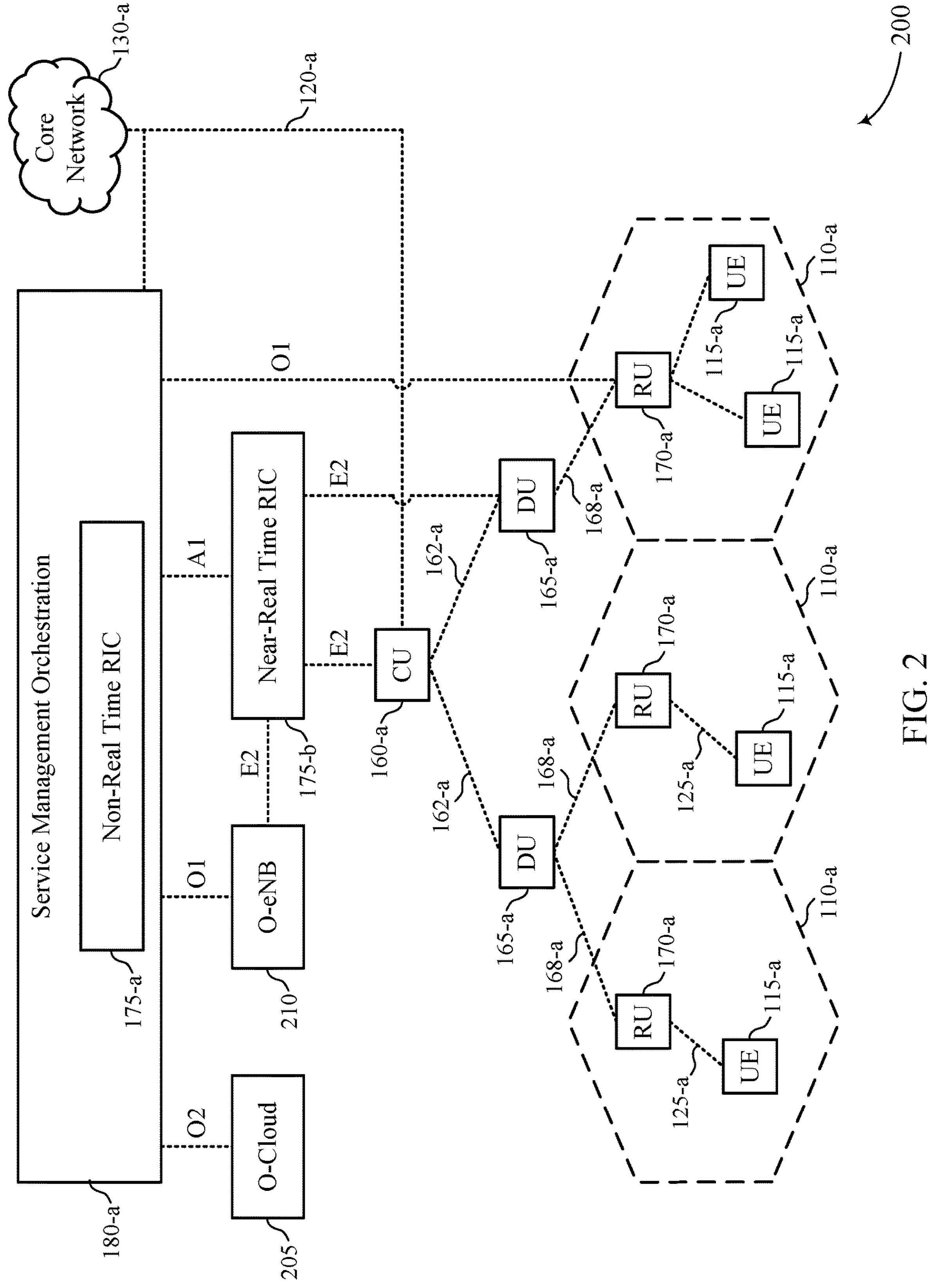
FIG. 2 shows an example of a network architecture that supports techniques for frequency band distortion correction in accordance with one or more aspects of the present disclosure.

FIG. 2 shows an example of a network architecture 200 (e.g., a disaggregated base station architecture, a disaggregated RAN architecture) that supports techniques for frequency band distortion correction in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

A network entity 105 and a UE 115-*a* may reduce both FDRSB noise and power expenditure associated with FDRSB correction by operating in accordance with the techniques described herein. For example, the UE 115-*a* may transmit to the network entity 105 a CSI report that indicates one or more signal quality values (e.g., an SNR value) associated with a set of communication chains used to communicate with the network entity 105. As such, the network entity 105 may use the SNR value in accordance with an FDRSB identification procedure to determine an FDRSB correction table associated with a set of frequency bands and the set of communication chains. For example, as part of the FDRSB identification procedure, the network entity 105 may determine a respective FDRSB distortion level for each transmission chain and use the respective FDRSB distortion level and the reported SNR value to determine the thermal noise level associated with the set of communication chains. In accordance with the thermal noise level and an MCS operation level, the network entity 105 may determine an EVM threshold value. In some examples, the network entity 105 may compare the FDRSB distortion level for a given transmission chain across the set of frequency bands, such that for frequency bands that the FDRSB distortion level is above the EVM threshold, the network entity 105 may determine that correcting FDRSB for the corresponding communication chain may reduce noise.

Based on comparing the respective FDRSB distortion level for each transmission chain across the set of frequency bands, the network entity 105 may generate the FDRSB correction table that indicates multiple indexes of frequency bands and which communication chains would benefit from FDRSB correction for each of the multiple indexes of frequency bands. The network entity 105 may transmit to the UE 115-*a* a control message that indicates the FDRSB correction table. As such, the UE 115-*a* may use the FDRSB correction table to demodulate one or more data messages. For example, the UE 115-*a* may receive a data message across one or more frequency bands and may apply FDRSB correction on the communication chains indicated in the FDRSB correction table for each of the one or more frequency bands that carry the data message.

Figure 3:
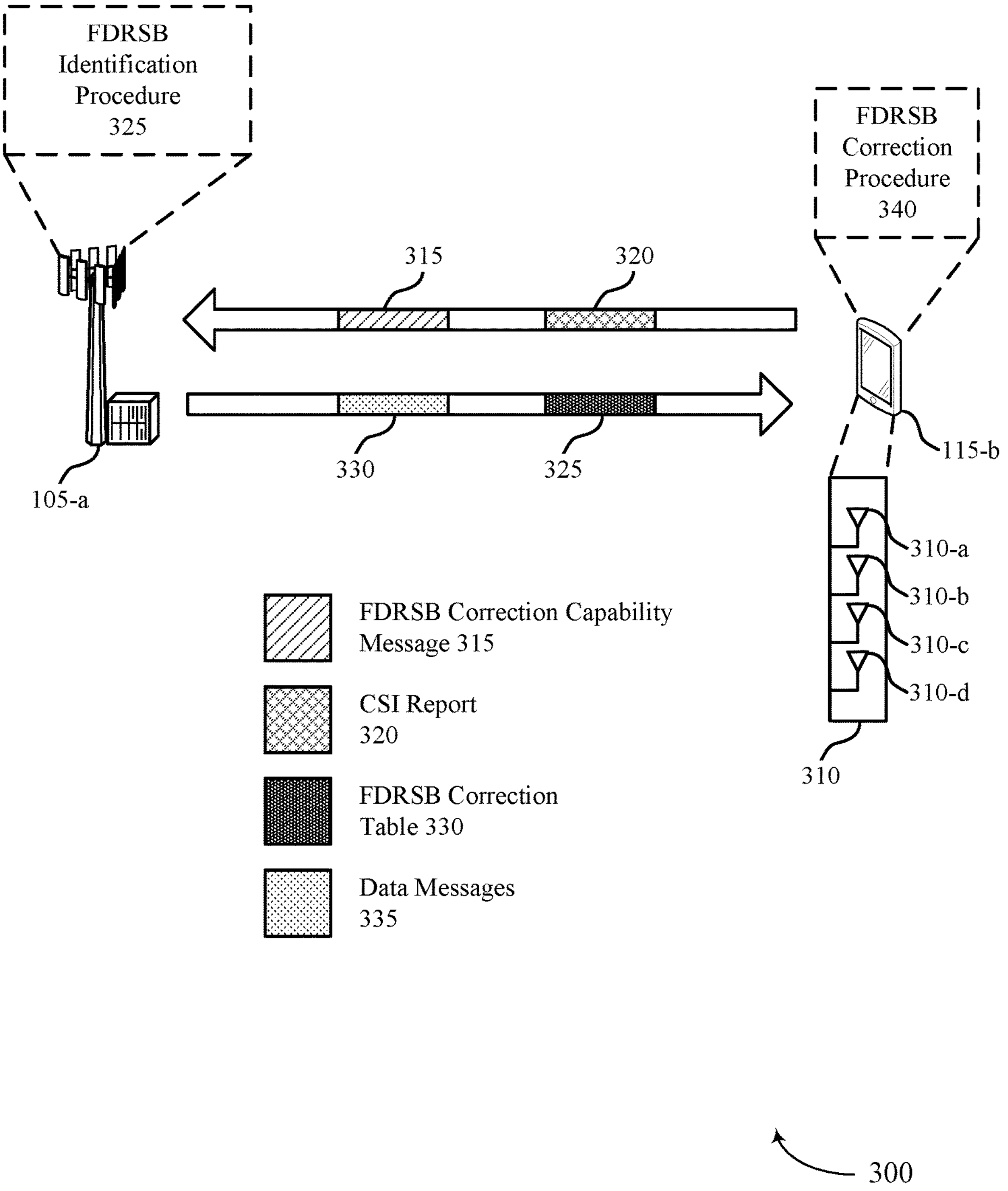
FIG. 3 shows an example of a wireless communications system that supports techniques for frequency band distortion correction in accordance with one or more aspects of the present disclosure.

FIG. 3 shows an example of a wireless communications system 300 that supports techniques for frequency band distortion correction in accordance with one or more aspects of the present disclosure. The wireless communications system 300 may include a network entity 105-*a* and a UE 115-*b*, which may represent examples of a network entity 105 and a UE 115 as described with reference to FIG. 1 and FIG. 2.

As illustrated in FIG. 3, the UE 115-*b* may include one or more antenna ports 310 that are associated with one or more antenna arrays 305. While FIG. 3 illustrates the UE 115-*b* including four antenna ports 310 (e.g., antenna port 310-*a*, 310-*b*, 310-*c*, and 310-*d*) in a single antenna array 305, it is understood that the UE 115-*b* may include any quantity of antenna ports 310 associated with any quantity of antenna arrays. Additionally, the UE 115-*b* may be configured with a quantity of communication chains, which may each include circuitry or components configured to generate and transmit a signal at the UE 115-*b*, receive a signal at the UE 115-*b*, or both. A communication chain may, in some examples, be referred to as a transmit chain in the case of transmission at the UE 115-*b* or a receive chain in case of reception at the UE 115-*b*. A quantity of antenna ports 310 at the UE 115-*b* may be the same as or different than the quantity of communication chains. A single communication chain may be used to generate a signal for transmission from a single antenna port (e.g., a one-to-one mapping for each transmission) or via multiple antenna ports. The UE 115-*b* may transmit a total quantity of simultaneous transmissions that may not exceed a quantity of communication chains at the UE 115-*b*.

In some examples, the UE 115-*b* may communicate with the network entity 105-*a* across a set of frequency bands in accordance with the set of communication chains. For instance, the UE 115-*b* or the network entity 105-*a* may modulate and transmit a wireless signal using a respective transmission modulator. For example, the network entity 105-*a* may generate a wireless signal in accordance with Equation 1:

$$s_{out}(t) = I_{out}(t) + jQ_{out}(t) \tag{1}$$

where $I_{out}(t)$ is the in-phase portion of the signal and $Q_{out}(t)$ is the quadrature portion of the wireless signal. In some examples, however, the transmission modulator may introduce FDRSB impairment into the wireless signal. For example, the error introduced by FDRSB may be associated with the frequency of the wireless signal, in accordance with Equation 2:

$$s_{out}(f) = K_1(f)\cdot s_{in}(f) + K_2(f)\cdot s_{in}^*(-f) \tag{2}$$

where $s_{in}(f)$ is the input of the wireless signal and $K_1(f)$ and $K_2(f)$ are frequency dependent errors associated with the $I_{out}$ and $Q_{out}$ respectively. For example, the values of $K_1(f)$ and $K_2(f)$ may be in accordance with Equation 3:

$$K_1(f) = 1 + g(f)e^{j\theta(f)};\ K_2(f) = 1 - g(f)e^{j\theta(f)} \tag{3}$$

where g(f) is a difference in gain between $I_{out}$ and $Q_{out}$ and θ(f) is a difference in phase between $I_{out}$ and $Q_{out}$. As such, $K_1(f)$ and $K_2(f)$ may be used to determine the error associated with $s_{out}(f)$, in accordance with Equation 4:

$$s_{out}(f) = K_1(f)\left(s_{in}(f) + \frac{K_2(f)}{K_1(f)}\cdot s_{in}^*(-f)\right) \tag{4}$$

where the multiplication of $K_1(f)$ may be associated with channel estimation and $$\frac{K_2(f)}{K_1(f)}$$

may be an example of FDRSB impairment caused by the transmission modulator.

As described in Equation 4, the FDRSB impairment may be dependent on the frequency at which the wireless signal in transmitted, where the FDRSB impairment may increase as the frequency increases. Additionally, or alternatively, as the quantity of communication chains used for concurrent signaling increases (e.g., multi-input/multi-output (MIMO)) the FDRSB associated with the concurrent signaling may increase. Additionally, or alternatively, as the quadrature amplitude modulation (QAM) order increases (e.g., 4-QAM, 16-QAM, 64-QAM, 356-QAM, 1024-QAM, etc.) the wireless transmissions may become more sensitive to FDRSB threshold (e.g., associated with a lower FDRSB level threshold).

In some examples, the UE 115-*b* may operate in accordance with an FDRSB correction procedure 340 to reduce the FDRSB associated with receiving a wireless signal from the network entity 105-*a*. For example, the antenna ports 310 at the UE 115-*b* (e.g., receivers) may estimate the FDRSB and cancel (e.g., remove) the FDRSB from the signal. For example, the UE 115-*b* may determine the FDRSB impairment associated with a MIMO system for each communication chain in accordance with Equation 5:

$$y(f) = H(f)(s(f).*k_1(f) + s^*(-f).*k_2(f)); \quad 5$$
$$s(f) \triangleq [s_1(f)\, s_2(f)\ \dots\ s_i(f)]^T;$$
$$k_1(f) \triangleq \left[k_1^1(f)\, k_1^2(f)\ \dots\ k_1^i(f)\right]^T;$$
$$k_2(f) \triangleq \left[k_2^1(f)\, k_2^2(f)\ \dots\ k_2^i(f)\right]^T$$

where H(f) may be the frequency channel, $s_i(f)$ may be a wireless signal from the $i^{th}$ antenna port 310, $$k_1^i(f)$$

may be a first FDRSB of the $i^{th}$ antenna port 310, and $$k_2^i(f)$$

may be a second FDRSB filter of the $i^{th}$ antenna port 310. The UE 115-*b* may perform the estimation over one or more pilots (e.g., one or more demodulated reference signals (DMRSs), sounding reference signals (SRSs), or both). If the pilot is precoded, the UE 115-*b* may have the precoder to reconstruct the communication chain input (e.g., the network entity 105-*a* may signal to the UE 115-*b* the precoder for the pilot). Equation 5 may be rewritten relative to the FDRSB impairment $$\left(\text{e.g., } \frac{K_2(f)}{K_1(f)}\right)$$

and a channel estimation (e.g., $\tilde{H}(f)$), in accordance with Equation 6:

$$y(f) = \tilde{H}(f)(s(f) + s^*(-f).*\Phi(f)) + w(f);\ \text{where} \quad 6$$
$$\tilde{H}(f) = H(f)*\text{diag}(K_1(f));$$
$$\Phi(f) = \frac{K_2(f)}{K_1(f)}$$

In some examples, the UE 115-*b* may perform the channel estimation to determine $\tilde{H}(f)$ in accordance with one or more different types of channel estimation methods. By determining the value of $\tilde{H}(f)$, the UE 115-*b* may estimate the value of $\Phi(f)$, which may correspond to the FDRSB impairment. Based on the estimation of $\Phi(f)$, the UE 115-*b* may remove the FDRSB impairment in accordance with Equation 7:

$$y_{corrected}(f) = y(f) - H(f)\Phi(f)s^*(-f) \quad 7$$

In some cases, however, estimation and cancellation of the FDRSB may be associated with a level of complexity at the UE 115-*b* which may increase digital power consumption and incur latency at the demodulator of the UE 115-*b*. Additionally, or alternatively, the cancellation of the FDRSB may not translate to an improvement in the performance. For instance, one or more other types of noise associated with the wireless signal (e.g., thermal noise) may be greater than FDRSB impairment, such that FDRSB noise may be neglected. In such instances, eliminating the FDRSB noise may not change the final error associated with demodulating a wireless signal at the UE 115-*b* (e.g., the EVM of the demodulated signal). Additionally, or alternatively, the FDRSB impairment may be different across the different communication chains and across different frequency bands. As such, FDRSB mitigation may improve signal performance for some frequency bands and communication chains, while not improving signal performance for other frequency bands and communication chains.

As such, it may be advantageous of the UE 115-*b* to delineate between the types of noise associated with each communication chain across a set of frequency bands to determine whether FDRSB correction may improve signal quality for a given signal. In some examples, the network entity 105-*a* and a UE 115-*b* may reduce both FDRSB noise and power expenditure associated with FDRSB correction by operating in accordance with the techniques described herein. For example, the UE 115-*b* may transmit to the network entity 105-*a* an FDRSB correction capability message 315 indicating whether the UE 115-*b* can perform FDRSB correction. For instance, the FDRSB correction capability message 315 may include one bit, where a first value of the one bit indicates that the UE 115-*b* is capable of mitigating FDRSB impairment, and a second value of the one bit indicates the UE 115-*b* may not be capable of mitigating FDRSB impairment. In some examples, the UE 115-*b* may transmit the FDRSB correction capability message 315 via the MAC layer during initialization of communications with the network entity 105-*a*.

If the FDRSB correction capability message 315 indicates that the UE 115-*b* is capable of mitigating FDRSB impairment, the network entity 105-*a* may perform an FDRSB identification procedure 325. For example, the network entity 105-*a* may perform FDRSB measuring to determine the FDRSB level associated with the communication chains. The network entity 105-*a* may use one or more different methods for measuring the FDRSB level. In a first example, the network entity 105-*a* may measure the FDRSB level by performing self-measuring, in which the network entity 105-*a* may compare the input and output of each communication chain for a dedicated signal, to evaluate the FDRSB level per communication chain and per frequency band (e.g., resource element (RE)). For instance, the network entity 105-*a* may perform a first measurement, in accordance with Equation 8:

$$m_1(f) = K_1(f)\cdot u(-f) + K_2(f)u(f);\ \text{where} \quad (8)$$

$$u(f) = \begin{cases} 1 & f \geq 0 \\ 0 & f < 0 \end{cases}$$

Additionally, the network entity 105-*a* may perform a second measurement, in accordance with Equation 9:

$$m_1(f) = K_1(f)\cdot u(f) + K_2(f)u(-f);\ \text{where} \quad (9)$$

$$u(f) = \begin{cases} 1 & f \geq 0 \\ 0 & f < 0 \end{cases}$$

As such, the network entity 105-*a* may use $m_1(f)$ and $m_2(f)$ to determine the FDRSB value of $\Phi(f)$ in accordance with Equation 10:

$$K_1(f) = m_1(f)u(-f) + m_2(f)u(f); \quad (10)$$

$$K_2(f) = m_2(f)u(-f) + m_1(f)u(f);$$

$$\Phi(f) = \frac{K_2(f)}{K_1(f)}$$

In a second example, the network entity 105-*a* may measure the FDRSB by receiving one or more uplink indications from one or more UEs 115 served by the network entity 105-*a*, where the served UE s 115 may estimate the FDRSB level. As such, the network entity 105-*a* may receive the respective indications of FDRSB from the respective UEs 115 and determine the FDRSB level. In accordance with either the first example, the second example, or both, the network entity 105-*a* may determine the FDRSB level associated with each of the communication chains.

Based on measuring the FDRSB level, the network entity 105-*a* may determine the thermal noise level associated with the communication chains. For example, the UE 115-*b* may transmit to the network entity 105-*a* a CSI report 320 that includes one or more quality parameters (such as an SNR value associated with the communication chains at the UE 115-*b*). In some cases, the SNR value indicated by the UE 115-*b* may be the total SNR associated with the communication chains, where the total SNR includes both the FDRSB distortion level and the thermal noise level. For example, the total SNR may be described relative to FDRSB and thermal noise, in accordance with Equation 11:

$$\frac{1}{SNR} = \frac{\sigma^2_{FDRSB}}{\sigma^2_x} + \frac{\sigma^2_{Thermal}}{\sigma^2_x} \quad (11)$$

where $\sigma_x$ is signal power. Based on Equation 11, the network entity 105-*a* may determine the thermal noise level based on taking the difference between the inverse of the reported SNR value (e.g., from CSI report 320) and the estimated FDRSB distortion level.

In some examples, the network entity 105-*a* may use the thermal noise level to determine an EVM threshold to compare to each FDRSB level associated with each communication chain. For example, the network entity 105-*a* may determine a first value for a thermal noise threshold and a second value for am operated MCS threshold, where the EVM threshold may be the greater of the first value and the second value. In some cases, the network entity 105-*a* may determine the thermal noise threshold as a difference between the thermal noise level and a noise attenuation value (e.g., Y[dB]). In some examples, the value of Y[dB] may be a positive or negative value and may be different across multiple network entities 105. In some cases, the network entity 105-*a* may determine the operated MCS threshold based on the MCS used for communications by the network entity 105-*a*. For example, the operated MCS threshold may be determined such that the SNR associated with corresponding communications satisfies MCS decoding at the UE 115-*b*.

In some examples, the network entity 105-*a* may use the EVM threshold to determine which communication chains and frequency bands may experience improved quality from FDRSB correction by the UE 115-*b*. For instance, the network entity 105-*a* may determine for the UE 115-*b* to correct FDRSB for a given communication chain and for a given frequency band if the FDRSB associated with the given communication chain for the given frequency band is greater than the EVM threshold. In some examples, the network entity 105-*a* may include information associated with FDRSB correction for each communication chain and each frequency band in an FDRSB correction table 330. Further discussion of the network entity 105-*a* performing FDRSB identification procedure 325 to determine the FDRSB correction table 330 is described herein, including with reference to FIG. 4.

The network entity 105-*a* may transmit a control message to the UE 115-*b* that includes the FDRSB correction table 330. For example, the network entity 105-*a* may transmit the FDRSB correction table 330 via a physical downlink control channel (PDCCH). As such, the UE 115-*b* may use the FDRSB correction table 330 to decode one or more data messages 335. For example, the UE 115-*b* may receive a data message 335 across one or more frequency bands, and may apply FDRSB correction on the transmission chains indicated in the FDRSB correction table 330 for each of the one or more frequency bands that carry the data message 335. For example, the UE 115-*b* may be associated with N communication chains associated with a system in accordance with Equation 12:

$$Q(f) = U(f)\begin{bmatrix} \Phi_1(f) \\ \Phi_2(f) \\ \vdots \\ \Phi_{NTx}(f) \end{bmatrix} + w(f);\ \text{where} \quad (12)$$

$$U(f) = \begin{bmatrix} \tilde{H}_{1,1}(f) & \tilde{H}_{1,2}(f) & \dots & \tilde{H}_{1,NTx}(f) \\ \tilde{H}_{2,1}(f) & \tilde{H}_{2,2}(f) & \dots & \tilde{H}_{2,NTx}(f) \\ \vdots & \vdots & \vdots & \vdots \\ \tilde{H}_{NRx,1}(f) & \tilde{H}_{NRx,2}(f) & \dots & \tilde{H}_{NRx,NTx}(f) \end{bmatrix}$$

-continued $$\mathrm{diag}(s_1^*(-f)s_2^*(-f)\ \dots\ s_{NTx}^*(-f))$$

In one example, the UE 115-*b* may determine (e.g., based on the FDRSB correction table 330) to refrain from FDRSB correction for the second communication chain. In such a one example, the UE 115-*b* may remove each entry from Q(f) that includes a subscript of 2 (e.g., remove $\tilde{H}_{2,1}(f)$ . . . $\tilde{H}_{2,NTx}(f)$, $\tilde{H}_{1,2}(f)$ . . . $\tilde{H}_{NRx,2}(f)$, $$s_2^*(-f),$$

and $\Phi_2(f)$). As such, the UE 115-*b* may perform an FDRSB correction procedure 340 in accordance with the FDRSB correction table 330.

Figure 4:
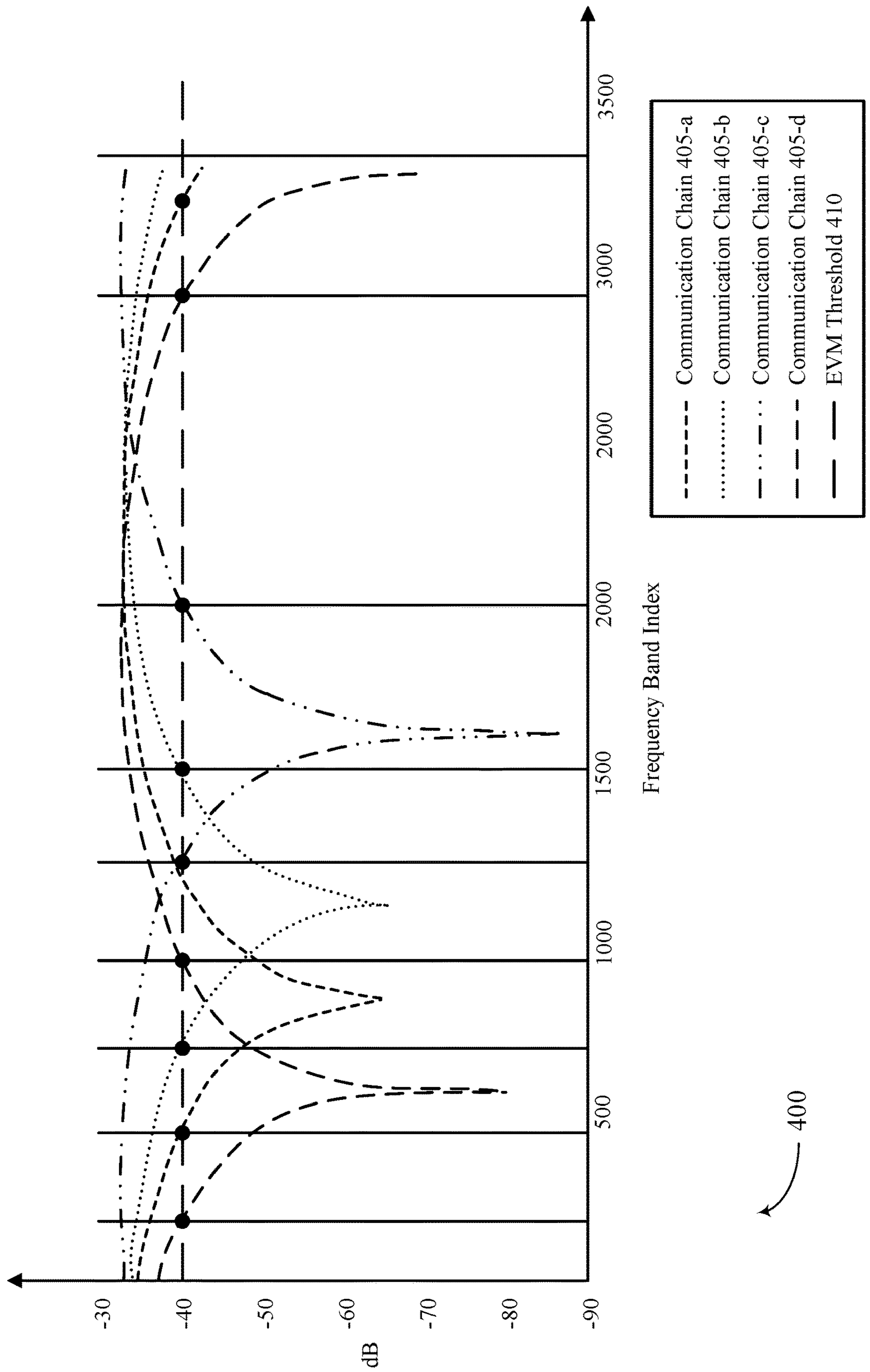
FIG. 4 shows an example of a frequency domain residual sideband (FDRSB) identification procedure that supports techniques for frequency band distortion correction in accordance with one or more aspects of the present disclosure.

FIG. 4 shows an example of an FDRSB identification procedure 400 that supports techniques for frequency band distortion correction in accordance with one or more aspects of the present disclosure. The FDRSB identification procedure 400 may implement one or more aspects of wireless communications system 100, network architecture 200, and wireless communications system 300. For instance, the FDRSB identification procedure 400 may be an example of the FDRSB identification procedure 325, as described with reference to FIG. 3. A network entity 105 may use the FDRSB identification procedure 400 to determine an FDRSB correction table (e.g., FDRSB correction table 330, with reference to FIG. 3). In some examples, the FDRSB correction table identifies which one or more frequency bands of a set of frequency bands (e.g., which resource element(s)) and which one or more communication chains 405 of a set of communication chains 405 may benefit from FDRSB correction at a UE 115.

In some examples of FDRSB identification procedure 400, the network entity 105 may measure a respective FDRSB level across a set of frequency bands for each of a set of communication chains 405 associated with the UE 115. For example, the UE 115 may be associated with communication chain 405-*a*, 405-*b*, 405-*c*, and 405-*d*, where the UE 115 uses the set of communication chains 405 to communicate with the network entity 105. The network entity 105 may measure the FDRSB level across the set of frequency bands for each of the communication chains 405 using one or more of the methods described in FIG. 3 (e.g., compare input and output for each communication chain 405 in accordance with Equations 8 through 10, or receive uplink indications of estimated FDRSB levels from one or more served UEs 115). As illustrated in FIG. 4, the network entity 105 may map the respective FDRSB level for each communication chain 405 across the set of frequency bands to determine an FDRSB curve for each of the communication chains 405. As illustrated in FIG. 4, each FDRSB curve shows the FDRSB level in dB at each frequency across a frequency band index. In some examples, each index of the frequency band index may be associated with a respective frequency sub carrier (SC). In some examples, each index of the frequency band index may be associated with a respective frequency resource element, respective frequency resource block, or another unit of frequency spacing.

In some examples, the network entity 105 may compare each FDRSB curve to an EVM threshold 410. In some cases, the network entity 105 may determine the EVM threshold 410 based on determining a thermal noise threshold and an operated MCS threshold in accordance with the techniques described with reference to FIG. 3. As illustrated if FIG. 4, the network entity 105 determines the EVM threshold 410 to be −40 dB; however, it is understood that the EVM threshold 410 may be at any dB level. The network entity 105 may determine that if a given FDRSB curve is greater than the EVM threshold 410 for a given frequency band, then the associated communication chain 405 may benefit from FDRSB correction at the given frequency band. Additionally, the network entity 105 may determine that if a given FDRSB curve is less than the EVM threshold 410 for a given frequency band, then the associated communication chain 405 may not benefit from FDRSB correction at the given frequency band.

In accordance with comparing the FDRSB curves to the EVM threshold 410, the network entity 105 may determine the FDRSB correction table, as described in Table 1:

TABLE 1

| Index of End of Frequency Band | Communication Chain Indices for FDRSB Correction |
|---|---|
| 170 | 1, 2, 3, 4 |
| 440 | 1, 2, 3 |
| 686 | 2, 3 |
| 945 | 3 |
| 1235 | 3, 4 |
| 1528 | 1, 4 |
| 1997 | 1, 2, 4 |
| 2900 | 1, 2, 3, 4 |
| 3276 | 1, 2, 3 |

In accordance with the example of Table 1, the FDRSB correction table may include a first column indicating the index of the end of a frequency band and a second column that indicates one or more communication chains 405 of the set of communication chains 405. In the example of Table 1, communication chain 405-*a*, 405-*b*, 405-*c*, and 405-*d* are associated with index value 1, 2, 3, and 4 respectively. For each frequency band index indicated in the FDRSB correction table, the FDRSB correction table may indicate which communication chains 405 are associated with an FDRSB level greater than the EVM threshold 410. For instance, from frequency band index 0 to index 170, each of communication chain 405-*a* through 405-*d* are associated with an FDRSB level above the EVM threshold 410. At frequency band index 170, the FDRSB level for communication chain 405-*d* becomes less than the EVM threshold 410. As such, Table 1 indicates that from frequency band index 170 to index 440, the communication chain 405-*a*, 405-*b*, and 405-*c* are greater than the EVM threshold 410. That is, each frequency band index indicated in Table 1 may correspond to a given FDRSB curve crossing the EVM threshold 410 (e.g., becoming greater than the EVM threshold 410 or becoming less than the EVM threshold 410). Further, it is understood that the values included in Table 1 illustrate one example of the FDRSB correction table; however, the FDRSB correction table could include any quantity of values associated with any quantity of communication chains 405 and any quantity of frequency bands.

Based on generating the FDRSB correction table, the network entity 105 may transmit the FDRSB correction table to the UE 115. As such, the UE 115 may use the FDRSB correction table in accordance with demodulating one or more data messages. For example, if the UE 115 receives a first data message via a frequency associated with frequency band index of 900, the UE 115 may determine to perform FDRSB correction for communication band 400-*c* and refrain from performing FDRSB correction for communication band 400-*a*, 400-*b*, and 400-*d*. As such, the UE 115 may increase signal quality associated with demodulating the first message while reducing the power expenditure and latency associated with performing FDRSB correction.

Figure 5:
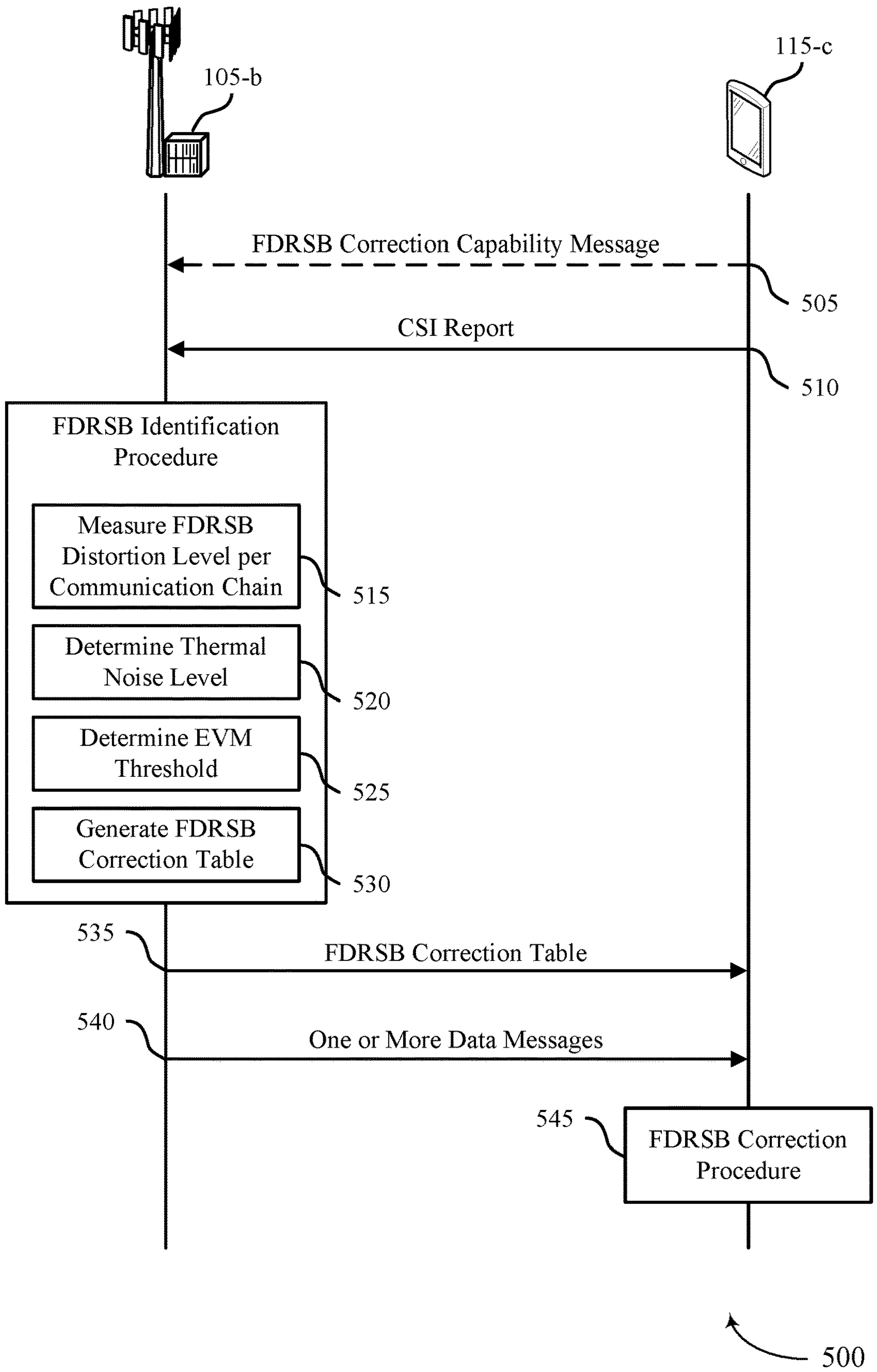
FIG. 5 shows an example of a process flow that supports techniques for frequency band distortion correction in accordance with one or more aspects of the present disclosure.

FIG. 5 shows an example of a process flow 500 that supports techniques for frequency band distortion correction in accordance with one or more aspects of the present disclosure. In some examples, process flow 500 may implement aspects of wireless communications system 100, network architecture 200, wireless communications system 300, and FDRSB identification procedure 400. Process flow 500 includes a UE 115-*c* and a network entity 105-*b* which may be respective examples of a UE 115 and a network entity 105, as described with reference to FIGS. 1 through 4. Alternative examples of the following may be implemented, where some steps are performed in a different order than described or are not performed at all. In some cases, steps may include additional features not mentioned below, or further steps may be added. In addition, while process flow 500 shows processes between a single UE 115 and a single network entity 105, these processes may occur between any quantity of network devices and network device types.

In some examples, at 505, the UE 115-*c* may transmit to the network entity 105-*b* a capability message indicating that the UE 115-*c* can perform the FDRSB correction.

At 510, the UE 115-*c* may transmit to the network entity 105-*b*, a CSI report that may indicate one or more signal quality values associated with a set of communication chains of the UE 115-*c*. For example, the one or more signal quality values may include at least a current SNR value at the UE 115-*c* associated with a set of communication chains.

In some examples, the network entity 105-*b* may perform, based on the one or more signal quality values, an FDRSB identification procedure to determine an FDRSB correction table associated with a set of frequency bands and the set of communication chains. Additionally, or alternatively, the network entity 105-*b* may perform the FDRSB identification procedure based on receiving or obtaining the capability message indicating that the UE 115-*c* can perform the FDRSB correction.

At 515, the network entity 105-*b* may measure an FDRSB distortion level across the set of frequency bands for the set of communication chains. In some examples, the network entity 105-*b* may generate a respective FDRSB curve for each transmission chain of the set of communication chains, where a given FDRSB curve may include an FDRSB value for each frequency band across the set of frequency bands for an associated communication chain (e.g., as described with reference to FIG. 4).

At 520, the network entity 105-*b* may determine a thermal noise level across the set of frequency bands for the set of communication chains based on the FDRSB distortion level and the one or more signal quality values. For example, the network entity 105-*b* may take the difference between the inverse of the current SNR value indicated by the UE 115-*c* and the FDRSB distortion level to determine the thermal noise level.

At 525 the network entity 105-*b* may determine an EVM threshold. For example, the network entity 105-*b* may determine a first value for a thermal noise threshold based on the thermal noise level across the set of frequency bands and a noise attenuation value associated with the network entity 105-*b*. Additionally, the network entity 105-*b* may determine a second value for an MCS scheme threshold associated with decoding data MCSs at the network entity 105-*b*. As such, the network entity 105-*b* may determine the EVM threshold as the higher value between the first value and the second value.

At 530, the network entity 105-*b* may determine the FDRSB correction table in accordance with the EVM threshold and the respective FDRSB curve for each communication chain. In some examples, the FDRSB correction table may include multiple of subsets of frequency bands that span the set of frequency bands, and a respective indication of one or more communication chains of the set of communication chains for each subset of frequency bands. In some examples, the one or more communication chains indicated for a given subset of frequency bands may be based on the FDRSB value associated with the one or more communication chains being greater than the EVM threshold for the given subset of frequency bands.

At 535, the network entity 105-*b* may output or transmit to the UE 115-*c*, a control message indicating the FDRSB correction table that identifies which one or more frequency bands of the set of frequency bands and which one or more communication chains of the set of communication chains to apply FDRSB correction. In some examples, the control message indicating the FDRSB correction table may be a PDCCH message.

At 540, the network entity 105-*b* may transmit or output to the UE 115-*c* one or more data messages.

At 545, the UE 115-*c* may demodulate the one or more data messages via at least one communication chain of the set of communication chains based on FDRSB correction performed in accordance with the FDRSB correction table. For example, the FDRSB correction may include estimating a respective FDRSB level for each of the one or more communication chains indicated for each subset of frequency bands of the multiple subsets of the frequency bands, and removing the estimated respective FDRSB level for each of the one or more communication chains indicated for each subset of frequency bands of the multiple subsets of the frequency bands.

Figure 6:
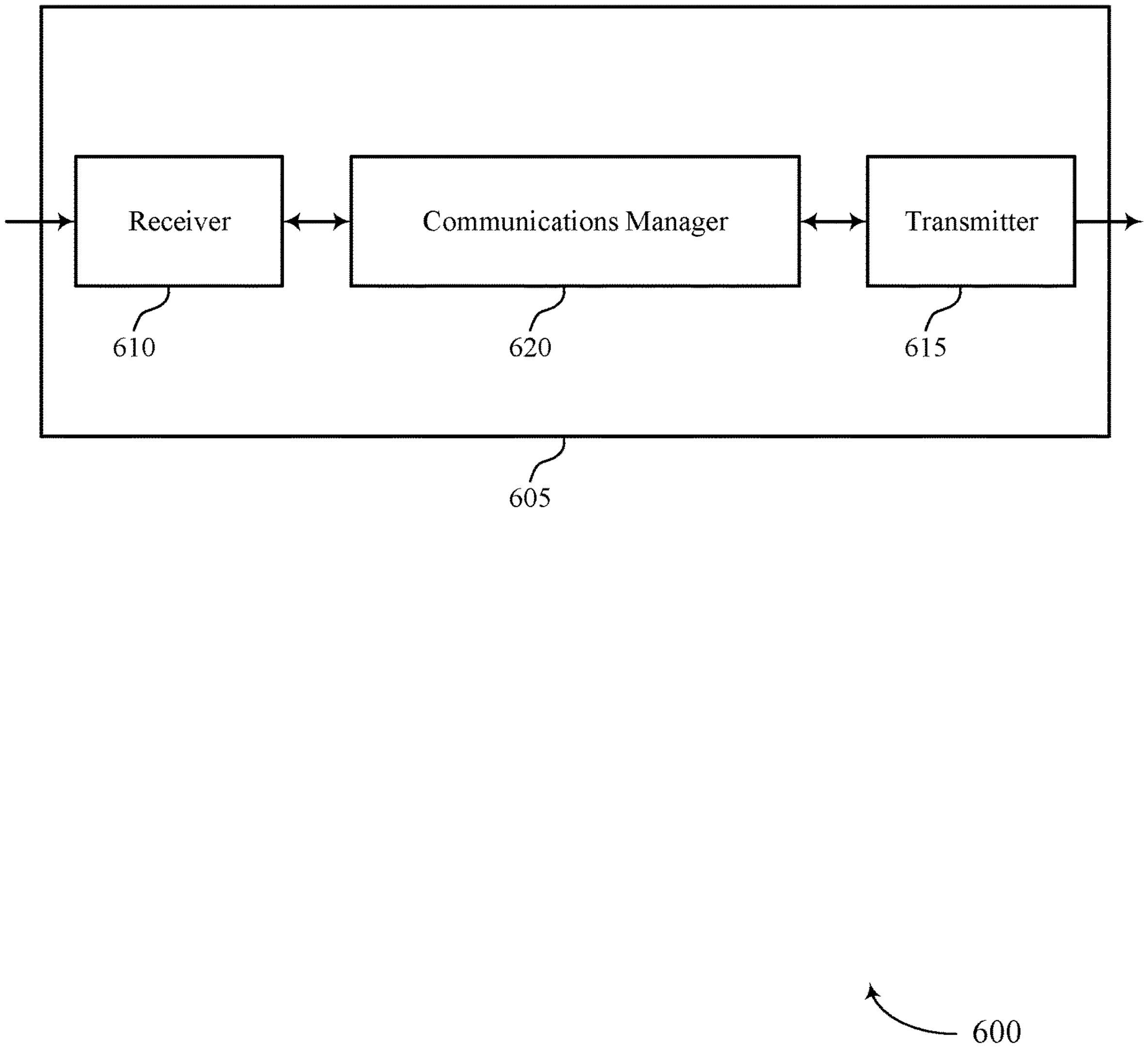
FIGS. 6 and 7 show block diagrams of devices that support techniques for frequency band distortion correction in accordance with one or more aspects of the present disclosure.

FIG. 6 shows a block diagram 600 of a device 605 that supports techniques for frequency band distortion correction in accordance with one or more aspects of the present disclosure. The device 605 may be an example of aspects of a network entity 105 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The communications manager 620, the receiver 610, the transmitter 615, or various combinations thereof or various components thereof may be examples of means for performing various aspects of techniques for frequency band distortion correction as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for obtaining, from a UE, a CSI report that indicates one or more signal quality values associated with a set of communication chains of the UE. The communications manager 620 is capable of, configured to, or operable to support a means for performing, based on the one or more signal quality values, a FDRSB identification procedure to determine an FDRSB correction table associated with a set of frequency bands and the set of communication chains. The communications manager 620 is capable of, configured to, or operable to support a means for outputting, to the UE, a control message indicating the FDRSB correction table that identifies which one or more frequency bands of the set of frequency bands and which one or more communication chains of the set of communication chains are associated with FDRSB correction.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for reduced processing, reduced power consumption, and a more efficient utilization of communication resources.

Figure 7:
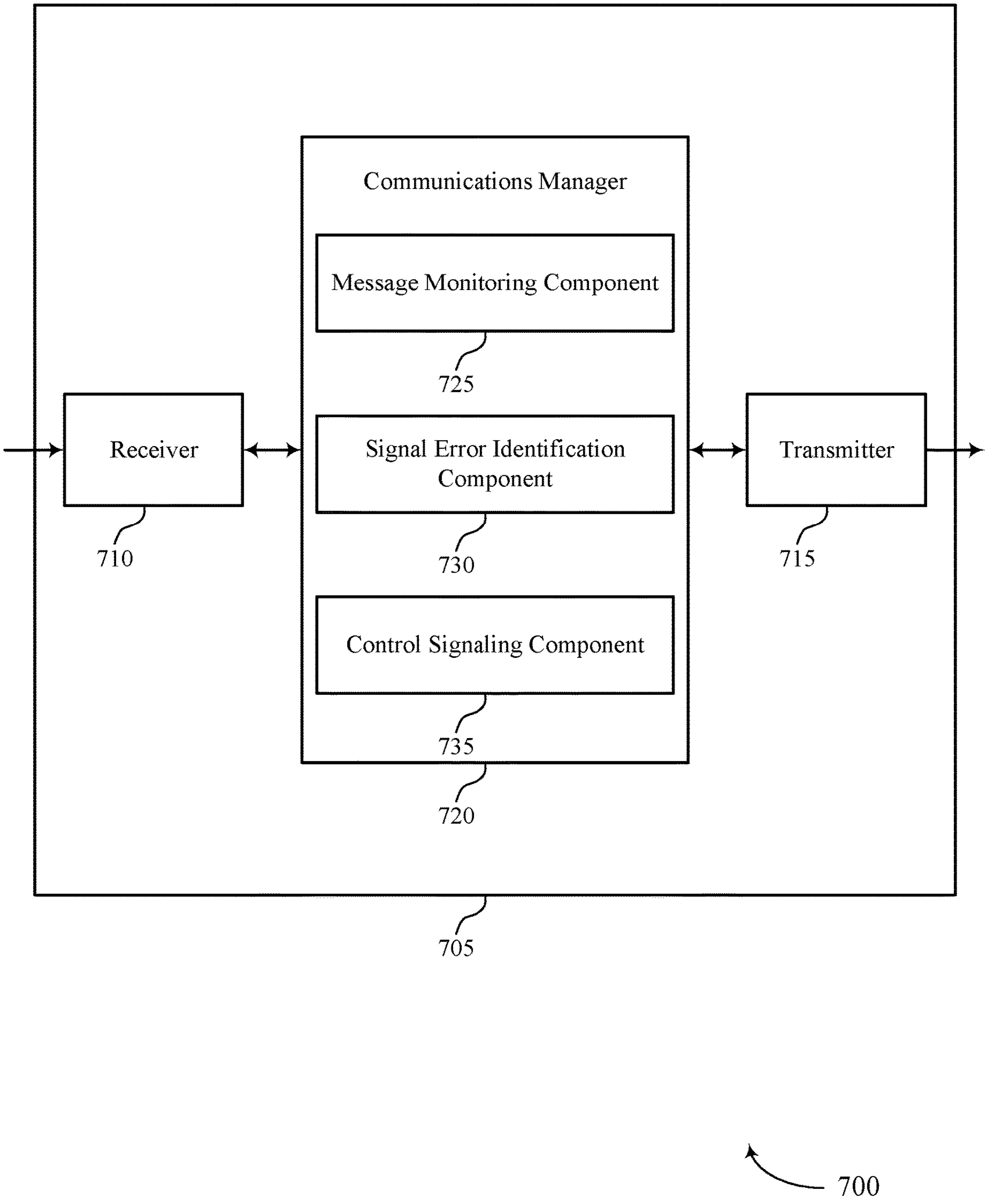

FIG. 7 shows a block diagram 700 of a device 705 that supports techniques for frequency band distortion correction in accordance with one or more aspects of the present disclosure. The device 705 may be an example of aspects of a device 605 or a network entity 105 as described herein. The device 705 may include a receiver 710, a transmitter 715, and a communications manager 720. The device 705, or one of more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The device 705, or various components thereof, may be an example of means for performing various aspects of techniques for frequency band distortion correction as described herein. For example, the communications manager 720 may include a message monitoring component 725, a signal error identification component 730, a control signaling component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The message monitoring component 725 is capable of, configured to, or operable to support a means for obtaining, from a UE, a CSI report that indicates one or more signal quality values associated with a set of communication chains of the UE. The signal error identification component 730 is capable of, configured to, or operable to support a means for performing, based on the one or more signal quality values, a FDRSB identification procedure to determine an FDRSB correction table associated with a set of frequency bands and the set of communication chains. The control signaling component 735 is capable of, configured to, or operable to support a means for outputting, to the UE, a control message indicating the FDRSB correction table that identifies which one or more frequency bands of the set of frequency bands and which one or more communication chains of the set of communication chains are associated with FDRSB correction.

Figure 8:
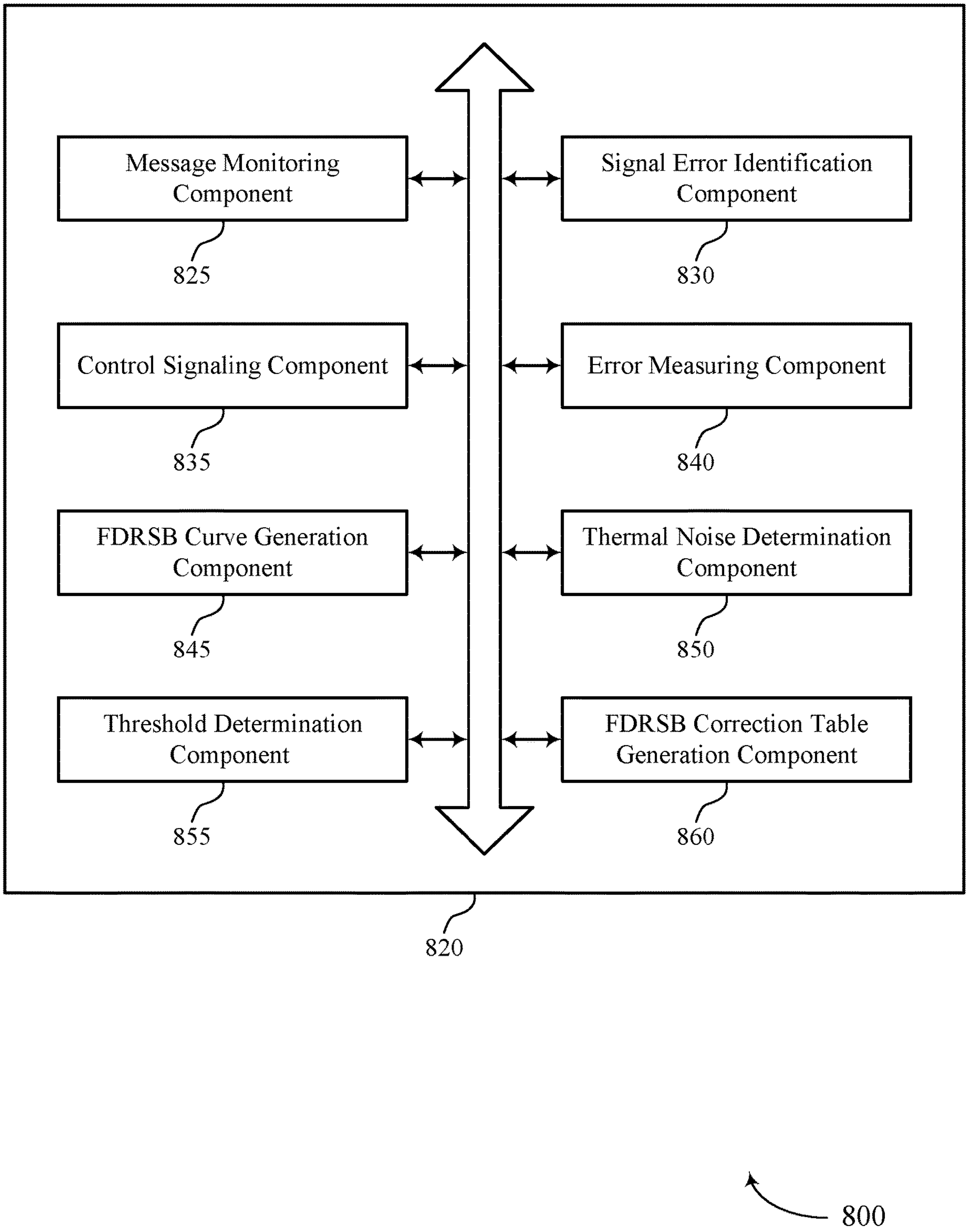
FIG. 8 shows a block diagram of a communications manager that supports techniques for frequency band distortion correction in accordance with one or more aspects of the present disclosure.

FIG. 8 shows a block diagram 800 of a communications manager 820 that supports techniques for frequency band distortion correction in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for frequency band distortion correction as described herein. For example, the communications manager 820 may include a message monitoring component 825, a signal error identification component 830, a control signaling component 835, an error measuring component 840, an FDRSB curve generation component 845, a thermal noise determination component 850, a threshold determination component 855, an FDRSB correction table generation component 860, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 820 may support wireless communications in accordance with examples as disclosed herein. The message monitoring component 825 is capable of, configured to, or operable to support a means for obtaining, from a UE, a CSI report that indicates one or more signal quality values associated with a set of communication chains of the UE. The signal error identification component 830 is capable of, configured to, or operable to support a means for performing, based on the one or more signal quality values, a FDRSB identification procedure to determine an FDRSB correction table associated with a set of frequency bands and the set of communication chains. The control signaling component 835 is capable of, configured to, or operable to support a means for outputting, to the UE, a control message indicating the FDRSB correction table that identifies which one or more frequency bands of the set of frequency bands and which one or more communication chains of the set of communication chains are associated with FDRSB correction.

In some examples, the message monitoring component 825 is capable of, configured to, or operable to support a means for obtaining, a capability message indicating that the UE is capable of performing the FDRSB correction, where the FDRSB identification procedure and the control message indicating the FDRSB correction table are based on the capability message.

In some examples, to support FDRSB identification procedure, the error measuring component 840 is capable of, configured to, or operable to support a means for measuring an FDRSB distortion level across the set of frequency bands for the set of communication chains. In some examples, to support FDRSB identification procedure, the FDRSB curve generation component 845 is capable of, configured to, or operable to support a means for generating a respective FDRSB curve for each communication chain of the set of communication chains, where a given FDRSB curve includes an FDRSB value for each frequency band across the set of frequency bands for an associated communication chain.

In some examples, the thermal noise determination component 850 is capable of, configured to, or operable to support a means for determining a thermal noise level across the set of frequency bands for the set of communication chains based on the FDRSB distortion level and the one or more signal quality values.

In some examples, the threshold determination component 855 is capable of, configured to, or operable to support a means for determining a first value for a thermal noise threshold based on the thermal noise level across the set of frequency bands and a noise attenuation value associated with the network entity. In some examples, the threshold determination component 855 is capable of, configured to, or operable to support a means for determining a second value for a MCS threshold associated with decoding data MCSs at the network entity. In some examples, the threshold determination component 855 is capable of, configured to, or operable to support a means for determining an EVM threshold as a higher value between the first value and the second value.

In some examples, determining the FDRSB correction table in accordance with the EVM threshold and the respective FDRSB curve for each communication chain, where the FDRSB correction table includes: a set of multiple subsets of frequency bands that spans the set of frequency bands; and a respective indication of one or more communication chains of the set of communication chains for each subset of frequency bands, where the one or more communication chains indicated for a given subset of frequency bands is based on the FDRSB value associated with the one or more communication chains being greater than the EVM threshold for the given subset of frequency bands.

In some examples, the one or more signal quality values associated with the set of frequency bands includes a current SNR value at the UE associated with the set of communication chains.

In some examples, the control message indicating the FDRSB correction table is a PDCCH message.

Figure 9:
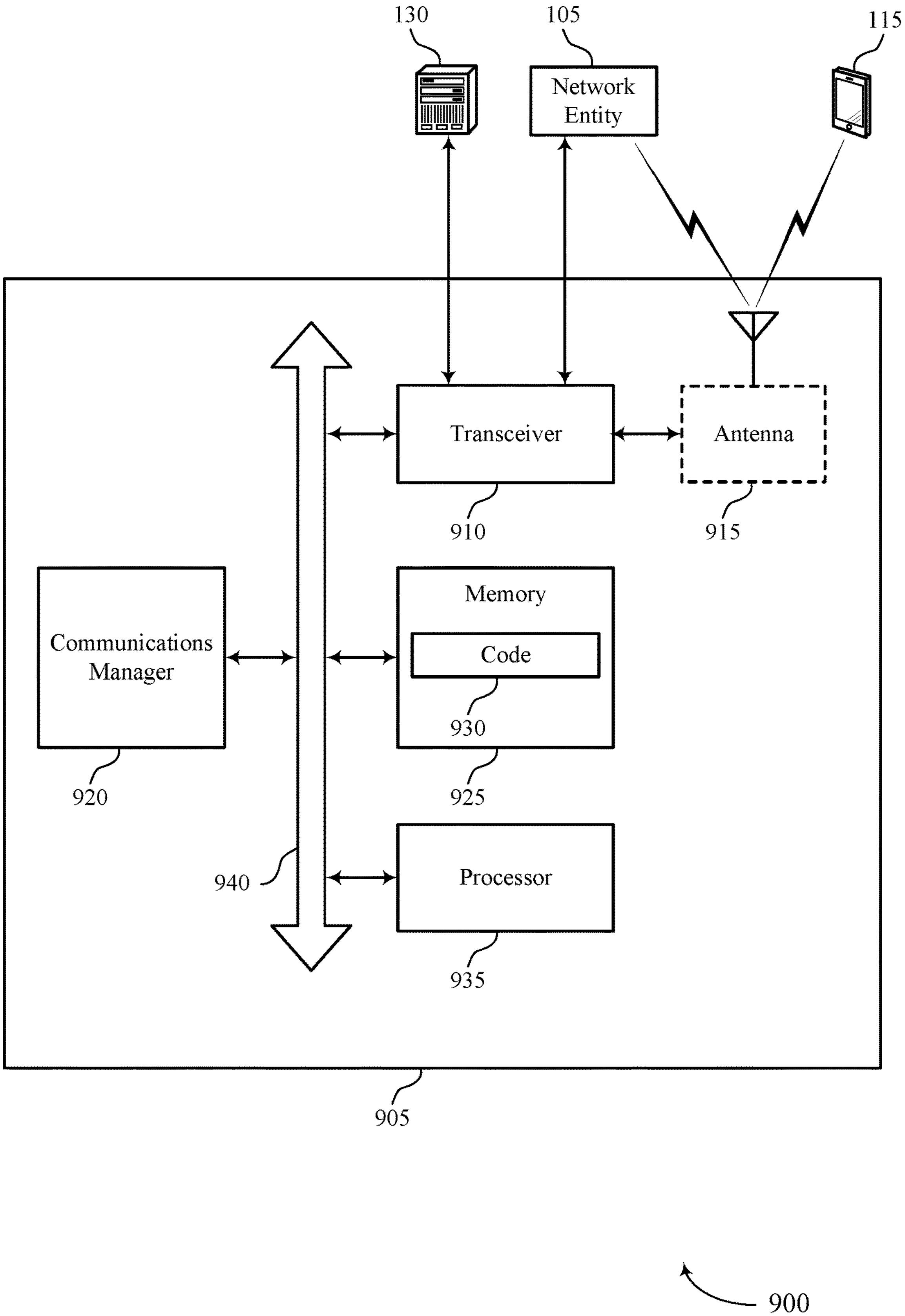
FIG. 9 shows a diagram of a system including a device that supports techniques for frequency band distortion correction in accordance with one or more aspects of the present disclosure.

FIG. 9 shows a diagram of a system 900 including a device 905 that supports techniques for frequency band distortion correction in accordance with one or more aspects of the present disclosure. The device 905 may be an example of or include the components of a device 605, a device 705, or a network entity 105 as described herein. The device 905 may communicate with one or more network entities 105, one or more UEs 115, or any combination thereof, which may include communications over one or more wired interfaces, over one or more wireless interfaces, or any combination thereof. The device 905 may include components that support outputting and obtaining communications, such as a communications manager 920, a transceiver 910, an antenna 915, at least one memory 925, code 930, and at least one processor 935. These components may be in electronic communication or otherwise coupled (e.g., operatively, communicatively, functionally, electronically, electrically) via one or more buses (e.g., a bus 940).

The transceiver 910 may support bi-directional communications via wired links, wireless links, or both as described herein. In some examples, the transceiver 910 may include a wired transceiver and may communicate bi-directionally with another wired transceiver. Additionally, or alternatively, in some examples, the transceiver 910 may include a wireless transceiver and may communicate bi-directionally with another wireless transceiver. In some examples, the device 905 may include one or more antennas 915, which may be capable of transmitting or receiving wireless transmissions (e.g., concurrently). The transceiver 910 may also include a modem to modulate signals, to provide the modulated signals for transmission (e.g., by one or more antennas 915, by a wired transmitter), to receive modulated signals (e.g., from one or more antennas 915, from a wired receiver), and to demodulate signals. In some implementations, the transceiver 910 may include one or more interfaces, such as one or more interfaces coupled with the one or more antennas 915 that are configured to support various receiving or obtaining operations, or one or more interfaces coupled with the one or more antennas 915 that are configured to support various transmitting or outputting operations, or a combination thereof. In some implementations, the transceiver 910 may include or be configured for coupling with one or more processors or one or more memory components that are operable to perform or support operations based on received or obtained information or signals, or to generate information or other signals for transmission or other outputting, or any combination thereof. In some implementations, the transceiver 910, or the transceiver 910 and the one or more antennas 915, or the transceiver 910 and the one or more antennas 915 and one or more processors or one or more memory components (e.g., the at least one processor 935, the at least one memory 925, or both), may be included in a chip or chip assembly that is installed in the device 905. In some examples, the transceiver 910 may be operable to support communications via one or more communications links (e.g., a communication link 125, a backhaul communication link 120, a midhaul communication link 162, a fronthaul communication link 168).

The at least one memory 925 may include RAM, ROM, or any combination thereof. The at least one memory 925 may store computer-readable, computer-executable code 930 including instructions that, when executed by one or more of the at least one processor 935, cause the device 905 to perform various functions described herein. The code 930 may be stored in a non-transitory computer-readable medium such as system memory or another type of memory. In some cases, the code 930 may not be directly executable by a processor of the at least one processor 935 but may cause a computer (e.g., when compiled and executed) to perform functions described herein. In some cases, the at least one memory 925 may contain, among other things, a BIOS which may control basic hardware or software operation such as the interaction with peripheral components or devices. In some examples, the at least one processor 935 may include multiple processors and the at least one memory 925 may include multiple memories. One or more of the multiple processors may be coupled with one or more of the multiple memories which may, individually or collectively, be configured to perform various functions herein (for example, as part of a processing system).

The at least one processor 935 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 935 may be configured to operate a memory array using a memory controller. In some other cases, a memory controller may be integrated into one or more of the at least one processor 935. The at least one processor 935 may be configured to execute computer-readable instructions stored in a memory (e.g., one or more of the at least one memory 925) to cause the device 905 to perform various functions (e.g., functions or tasks supporting techniques for frequency band distortion correction). For example, the device 905 or a component of the device 905 may include at least one processor 935 and at least one memory 925 coupled with one or more of the at least one processor 935, the at least one processor 935 and the at least one memory 925 configured to perform various functions described herein. The at least one processor 935 may be an example of a cloud-computing platform (e.g., one or more physical nodes and supporting software such as operating systems, virtual machines, or container instances) that may host the functions (e.g., by executing code 930) to perform the functions of the device 905. The at least one processor 935 may be any one or more suitable processors capable of executing scripts or instructions of one or more software programs stored in the device 905 (such as within one or more of the at least one memory 925). In some examples, the at least one processor 935 may include multiple processors and the at least one memory 925 may include multiple memories. One or more of the multiple processors may be coupled with one or more of the multiple memories, which may, individually or collectively, be configured to perform various functions herein. In some examples, the at least one processor 935 may be a component of a processing system, which may refer to a system (such as a series) of machines, circuitry (including, for example, one or both of processor circuitry (which may include the at least one processor 935) and memory circuitry (which may include the at least one memory 925)), or components, that receives or obtains inputs and processes the inputs to produce, generate, or obtain a set of outputs. The processing system may be configured to perform one or more of the functions described herein. For example, the at least one processor 935 or a processing system including the at least one processor 935 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 925 or otherwise, to perform one or more of the functions described herein.

In some examples, a bus 940 may support communications of (e.g., within) a protocol layer of a protocol stack. In some examples, a bus 940 may support communications associated with a logical channel of a protocol stack (e.g., between protocol layers of a protocol stack), which may include communications performed within a component of the device 905, or between different components of the device 905 that may be co-located or located in different locations (e.g., where the device 905 may refer to a system in which one or more of the communications manager 920, the transceiver 910, the at least one memory 925, the code 930, and the at least one processor 935 may be located in one of the different components or divided between different components).

In some examples, the communications manager 920 may manage aspects of communications with a core network 130 (e.g., via one or more wired or wireless backhaul links). For example, the communications manager 920 may manage the transfer of data communications for client devices, such as one or more UEs 115. In some examples, the communications manager 920 may manage communications with other network entities 105, and may include a controller or scheduler for controlling communications with UEs 115 in cooperation with other network entities 105. In some examples, the communications manager 920 may support an X2 interface within an LTE/LTE-A wireless communications network technology to provide communication between network entities 105.

The communications manager 920 may support wireless communications in accordance with examples as disclosed herein. For example, the communications manager 920 is capable of, configured to, or operable to support a means for obtaining, from a UE, a CSI report that indicates one or more signal quality values associated with a set of communication chains of the UE. The communications manager 920 is capable of, configured to, or operable to support a means for performing, based on the one or more signal quality values, a FDRSB identification procedure to determine an FDRSB correction table associated with a set of frequency bands and the set of communication chains. The communications manager 920 is capable of, configured to, or operable to support a means for outputting, to the UE, a control message indicating the FDRSB correction table that identifies which one or more frequency bands of the set of frequency bands and which one or more communication chains of the set of communication chains are associated with FDRSB correction.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 920 may be configured to perform various operations (e.g., receiving, obtaining, monitoring, outputting, transmitting) using or otherwise in cooperation with the transceiver 910, the one or more antennas 915 (e.g., where applicable), or any combination thereof. Although the communications manager 920 is illustrated as a separate component, in some examples, one or more functions described with reference to the communications manager 920 may be supported by or performed by the transceiver 910, one or more of the at least one processor 935, one or more of the at least one memory 925, the code 930, or any combination thereof (for example, by a processing system including at least a portion of the at least one processor 935, the at least one memory 925, the code 930, or any combination thereof). For example, the code 930 may include instructions executable by one or more of the at least one processor 935 to cause the device 905 to perform various aspects of techniques for frequency band distortion correction as described herein, or the at least one processor 935 and the at least one memory 925 may be otherwise configured to, individually or collectively, perform or support such operations.

Figure 10:
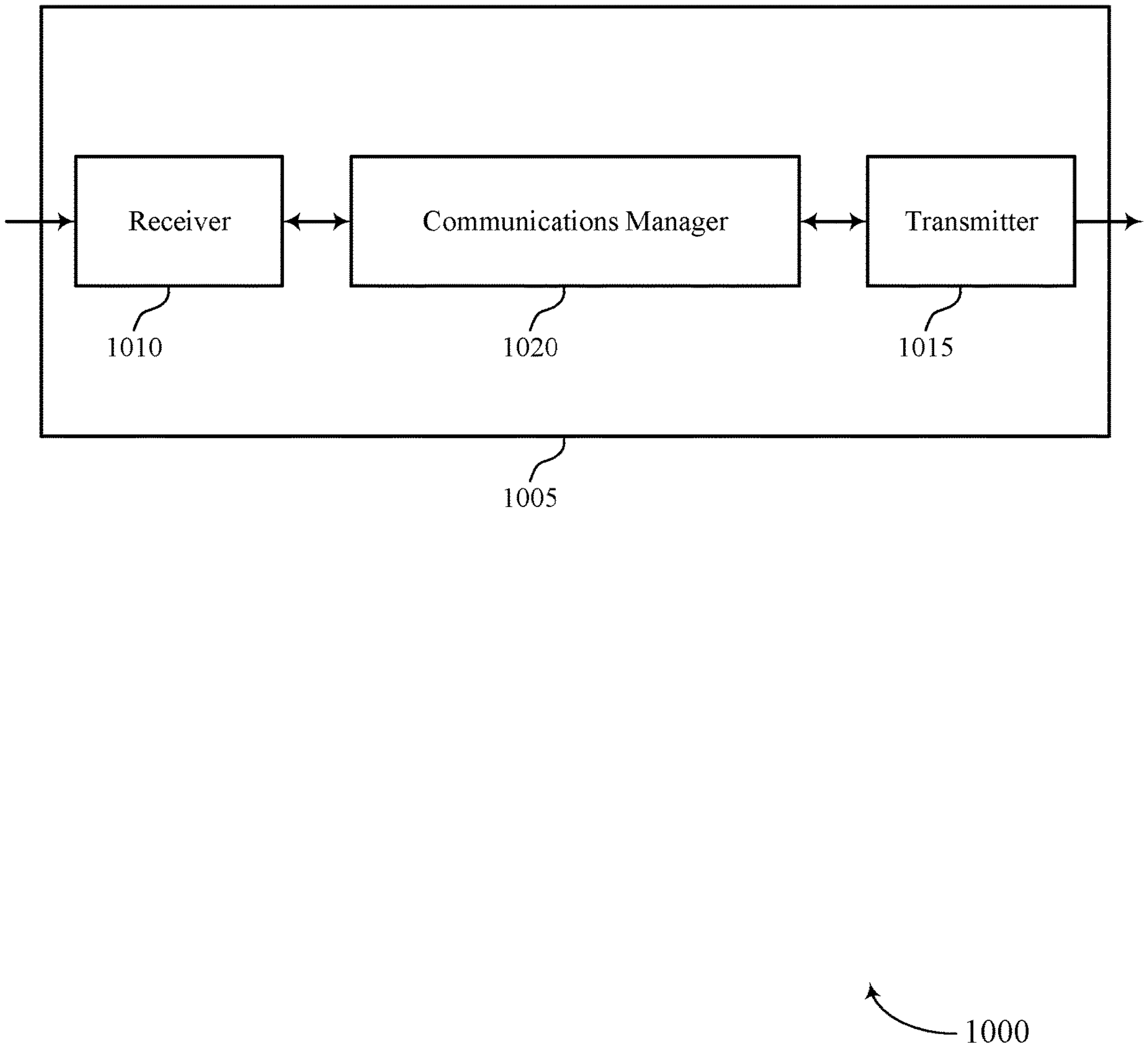
FIGS. 10 and 11 show block diagrams of devices that support techniques for frequency band distortion correction in accordance with one or more aspects of the present disclosure.

FIG. 10 shows a block diagram 1000 of a device 1005 that supports techniques for frequency band distortion correction in accordance with one or more aspects of the present disclosure. The device 1005 may be an example of aspects of a UE 115 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to, individually or collectively, support or enable the described techniques. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for frequency band distortion correction). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for frequency band distortion correction). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for frequency band distortion correction as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor. If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. For example, the communications manager 1020 is capable of, configured to, or operable to support a means for transmitting, to a network entity, a CSI report that indicates one or more signal quality values associated with a set of communication chains of the UE. The communications manager 1020 is capable of, configured to, or operable to support a means for receiving, based on transmitting the CSI report, a control message indicating a FDRSB correction table that identifies which one or more frequency bands of a set of frequency bands and which one or more communication chains of the set of communication chains of the UE to apply FDRSB correction. The communications manager 1020 is capable of, configured to, or operable to support a means for demodulating one or more messages via at least one communication chain of the set of communication chains based on FDRSB correction performed in accordance with the FDRSB correction table.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for reduced processing, reduced power consumption, and a more efficient utilization of communication resources.

Figure 11:
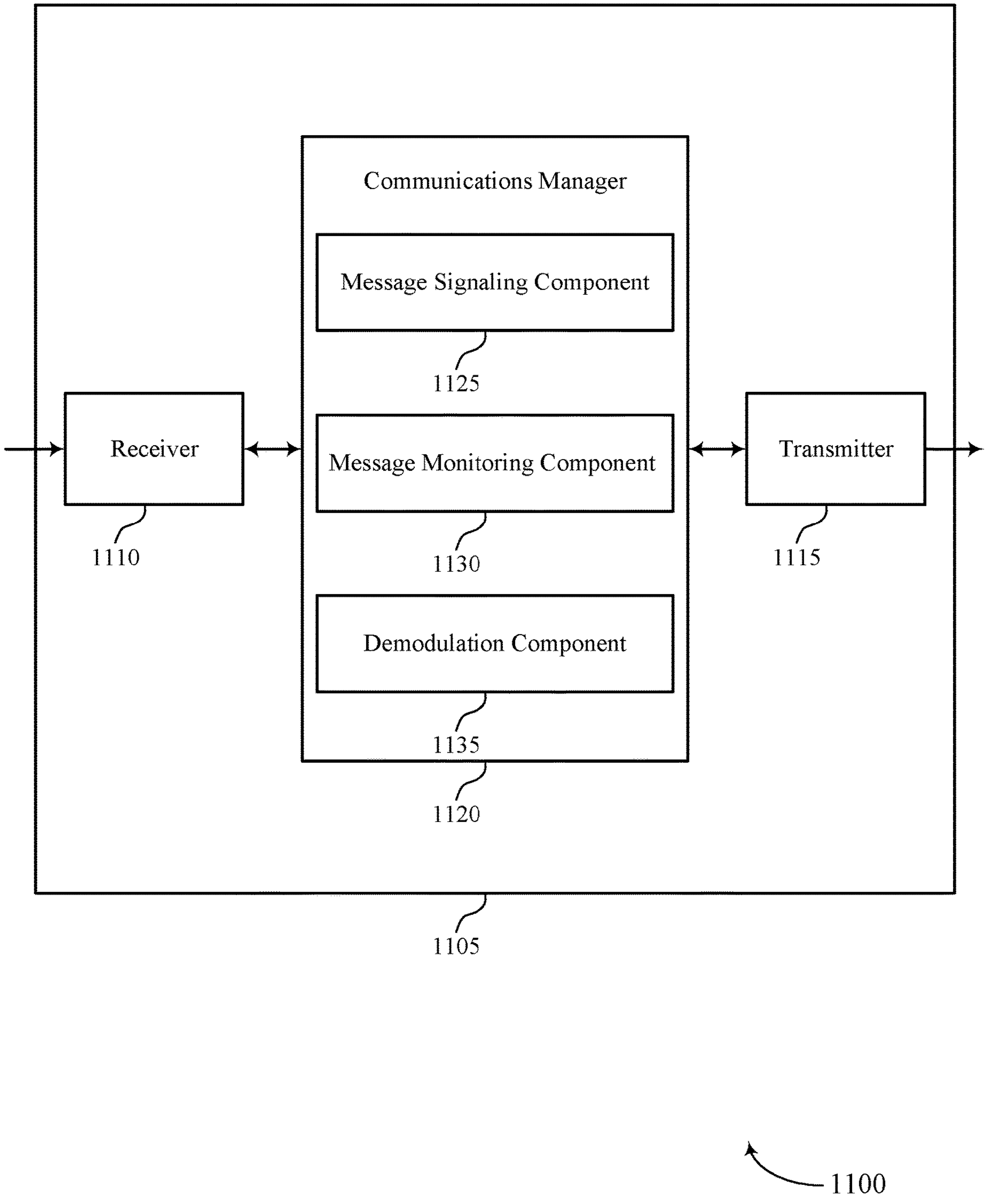

FIG. 11 shows a block diagram 1100 of a device 1105 that supports techniques for frequency band distortion correction in accordance with one or more aspects of the present disclosure. The device 1105 may be an example of aspects of a device 1005 or a UE 115 as described herein. The device 1105 may include a receiver 1110, a transmitter 1115, and a communications manager 1120. The device 1105, or one of more components of the device 1105 (e.g., the receiver 1110, the transmitter 1115, and the communications manager 1120), may include at least one processor, which may be coupled with at least one memory, to support the described techniques. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for frequency band distortion correction). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for frequency band distortion correction). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for frequency band distortion correction as described herein. For example, the communications manager 1120 may include a message signaling component 1125, a message monitoring component 1130, a demodulation component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The message signaling component 1125 is capable of, configured to, or operable to support a means for transmitting, to a network entity, a CSI report that indicates one or more signal quality values associated with a set of communication chains of the UE. The message monitoring component 1130 is capable of, configured to, or operable to support a means for receiving, based on transmitting the CSI report, a control message indicating a FDRSB correction table that identifies which one or more frequency bands of a set of frequency bands and which one or more communication chains of the set of communication chains of the UE to apply FDRSB correction. The demodulation component 1135 is capable of, configured to, or operable to support a means for demodulating one or more messages via at least one communication chain of the set of communication chains based on FDRSB correction performed in accordance with the FDRSB correction table.

Figure 12:
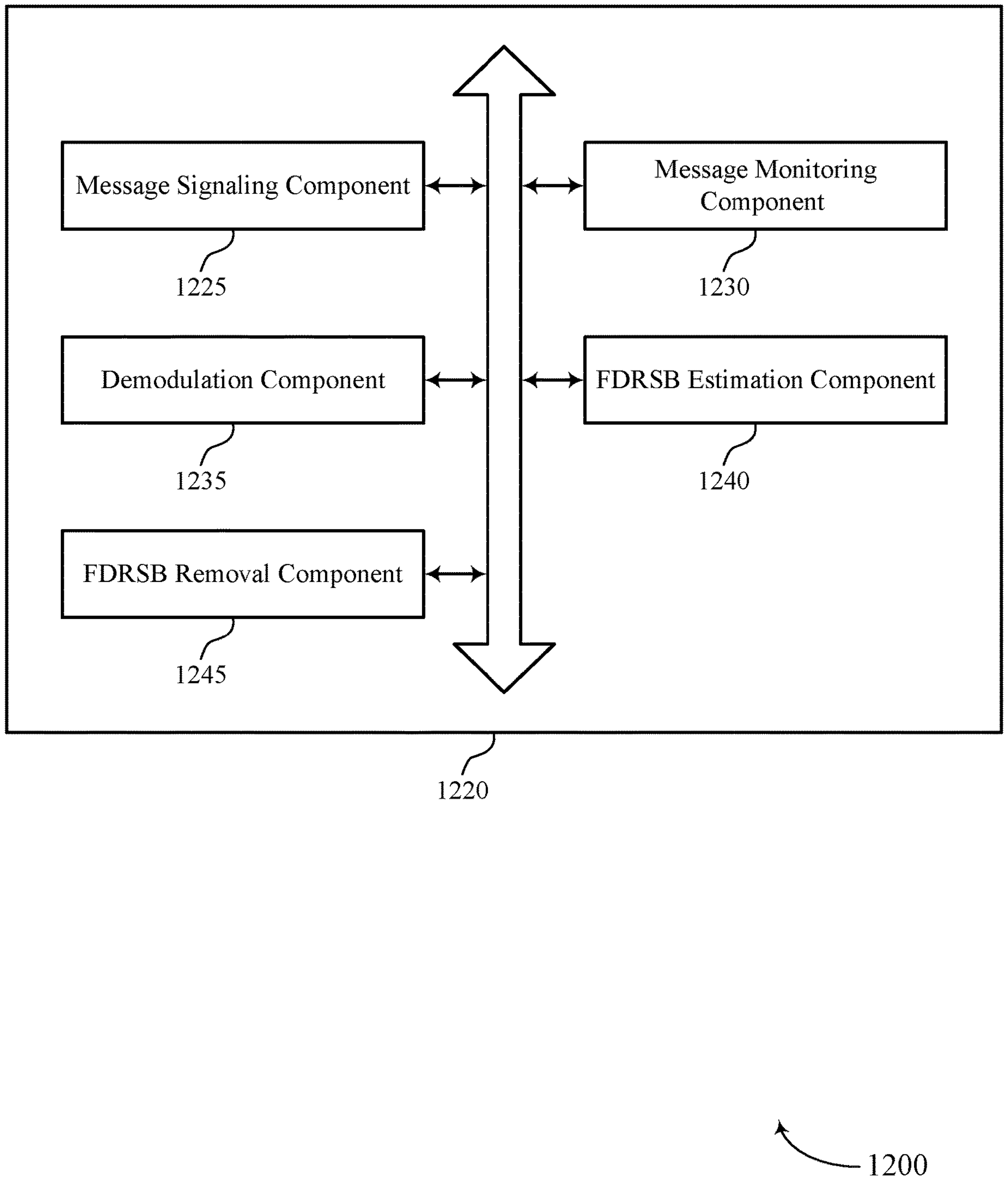
FIG. 12 shows a block diagram of a communications manager that supports techniques for frequency band distortion correction in accordance with one or more aspects of the present disclosure.

FIG. 12 shows a block diagram 1200 of a communications manager 1220 that supports techniques for frequency band distortion correction in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for frequency band distortion correction as described herein. For example, the communications manager 1220 may include a message signaling component 1225, a message monitoring component 1230, a demodulation component 1235, an FDRSB estimation component 1240, an FDRSB removal component 1245, or any combination thereof. Each of these components, or components or subcomponents thereof (e.g., one or more processors, one or more memories), may communicate, directly or indirectly, with one another (e.g., via one or more buses).

The communications manager 1220 may support wireless communications in accordance with examples as disclosed herein. The message signaling component 1225 is capable of, configured to, or operable to support a means for transmitting, to a network entity, a CSI report that indicates one or more signal quality values associated with a set of communication chains of the UE. The message monitoring component 1230 is capable of, configured to, or operable to support a means for receiving, based on transmitting the CSI report, a control message indicating a FDRSB correction table that identifies which one or more frequency bands of a set of frequency bands and which one or more communication chains of the set of communication chains of the UE to apply FDRSB correction. The demodulation component 1235 is capable of, configured to, or operable to support a means for demodulating one or more messages via at least one communication chain of the set of communication chains based on FDRSB correction performed in accordance with the FDRSB correction table.

In some examples, the message signaling component 1225 is capable of, configured to, or operable to support a means for transmitting, a capability message indicating that the UE is capable of performing the FDRSB correction, where the control message indicating the FDRSB correction table is based on the capability message.

In some examples, the FDRSB correction table includes an indication of a set of multiple subsets of frequency bands that spans the set of frequency bands; and a respective indication of one or more communication chains of the set of communication chains for each subset of frequency bands.

In some examples, to support performing the FDRSB correction, the FDRSB estimation component 1240 is capable of, configured to, or operable to support a means for estimating a respective FDRSB level for each of the one or more communication chains indicated for each subset of frequency bands of the set of multiple subsets of the frequency bands. In some examples, to support performing the FDRSB correction, the FDRSB removal component 1245 is capable of, configured to, or operable to support a means for removing the estimated respective FDRSB level for each of the one or more communication chains indicated for each subset of frequency bands of the set of multiple subsets of the frequency bands.

In some examples, the one or more signal quality values associated with the set of frequency bands includes a current SNR value at the UE associated with the set of communication chains.

In some examples, the control message indicating the FDRSB correction table is a PDCCH message.

Figure 13:
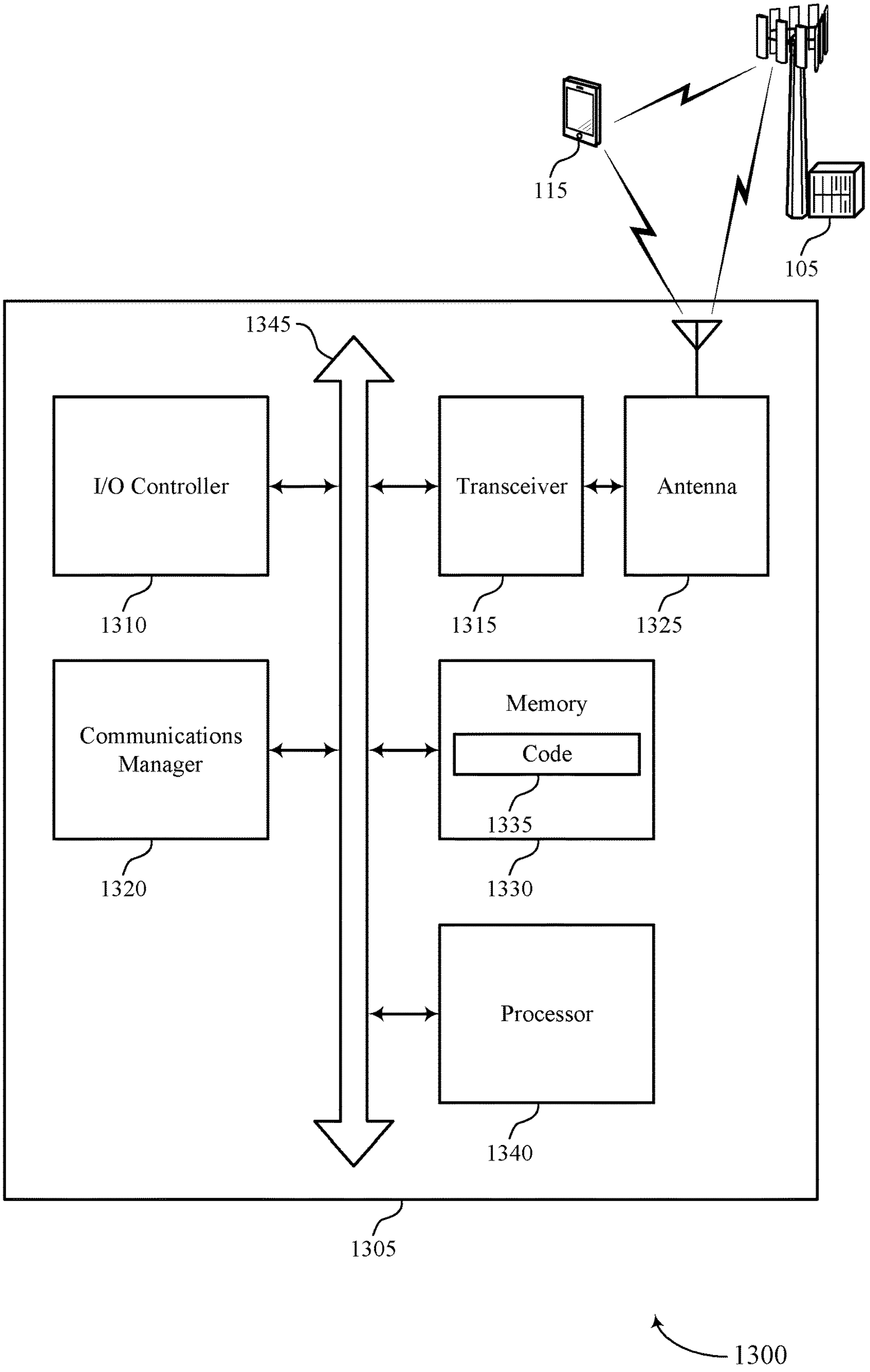
FIG. 13 shows a diagram of a system including a device that supports techniques for frequency band distortion correction in accordance with one or more aspects of the present disclosure.

FIG. 13 shows a diagram of a system 1300 including a device 1305 that supports techniques for frequency band distortion correction in accordance with one or more aspects of the present disclosure. The device 1305 may be an example of or include the components of a device 1005, a device 1105, or a UE 115 as described herein. The device 1305 may communicate (e.g., wirelessly) with one or more network entities 105, one or more UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, at least one memory 1330, code 1335, and at least one processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of one or more processors, such as the at least one processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The at least one memory 1330 may include random access memory (RAM) and read-only memory (ROM). The at least one memory 1330 may store computer-readable, computer-executable code 1335 including instructions that, when executed by the at least one processor 1340, cause the device 1305 to perform various functions described herein. The code 1335 may be stored in a non-transitory computer-readable medium such as system memory or another type of memory. In some cases, the code 1335 may not be directly executable by the at least one processor 1340 but may cause a computer (e.g., when compiled and executed) to perform functions described herein. In some cases, the at least one memory 1330 may contain, among other things, a basic I/O system (BIOS) which may control basic hardware or software operation such as the interaction with peripheral components or devices.

The at least one processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1340 may be configured to operate a memory array using a memory controller. In some other cases, a memory controller may be integrated into the at least one processor 1340. The at least one processor 1340 may be configured to execute computer-readable instructions stored in a memory (e.g., the at least one memory 1330) to cause the device 1305 to perform various functions (e.g., functions or tasks supporting techniques for frequency band distortion correction). For example, the device 1305 or a component of the device 1305 may include at least one processor 1340 and at least one memory 1330 coupled with or to the at least one processor 1340, the at least one processor 1340 and at least one memory 1330 configured to perform various functions described herein. In some examples, the at least one processor 1340 may include multiple processors and the at least one memory 1330 may include multiple memories. One or more of the multiple processors may be coupled with one or more of the multiple memories, which may, individually or collectively, be configured to perform various functions herein. In some examples, the at least one processor 1340 may be a component of a processing system, which may refer to a system (such as a series) of machines, circuitry (including, for example, one or both of processor circuitry (which may include the at least one processor 1340) and memory circuitry (which may include the at least one memory 1330)), or components, that receives or obtains inputs and processes the inputs to produce, generate, or obtain a set of outputs. The processing system may be configured to perform one or more of the functions described herein. For example, the at least one processor 1340 or a processing system including the at least one processor 1340 may be configured to, configurable to, or operable to cause the device 1305 to perform one or more of the functions described herein. Further, as described herein, being "configured to," being "configurable to," and being "operable to" may be used interchangeably and may be associated with a capability, when executing code stored in the at least one memory 1330 or otherwise, to perform one or more of the functions described herein.

The communications manager 1320 may support wireless communications in accordance with examples as disclosed herein. For example, the communications manager 1320 is capable of, configured to, or operable to support a means for transmitting, to a network entity, a CSI report that indicates one or more signal quality values associated with a set of communication chains of the UE. The communications manager 1320 is capable of, configured to, or operable to support a means for receiving, based on transmitting the CSI report, a control message indicating a FDRSB correction table that identifies which one or more frequency bands of a set of frequency bands and which one or more communication chains of the set of communication chains of the UE to apply FDRSB correction. The communications manager 1320 is capable of, configured to, or operable to support a means for demodulating one or more messages via at least one communication chain of the set of communication chains based on FDRSB correction performed in accordance with the FDRSB correction table.

By including or configuring the communications manager 1320 in accordance with examples as described herein, the device 1305 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the at least one processor 1340, the at least one memory 1330, the code 1335, or any combination thereof. For example, the code 1335 may include instructions executable by the at least one processor 1340 to cause the device 1305 to perform various aspects of techniques for frequency band distortion correction as described herein, or the at least one processor 1340 and the at least one memory 1330 may be otherwise configured to, individually or collectively, perform or support such operations.

Figure 14:
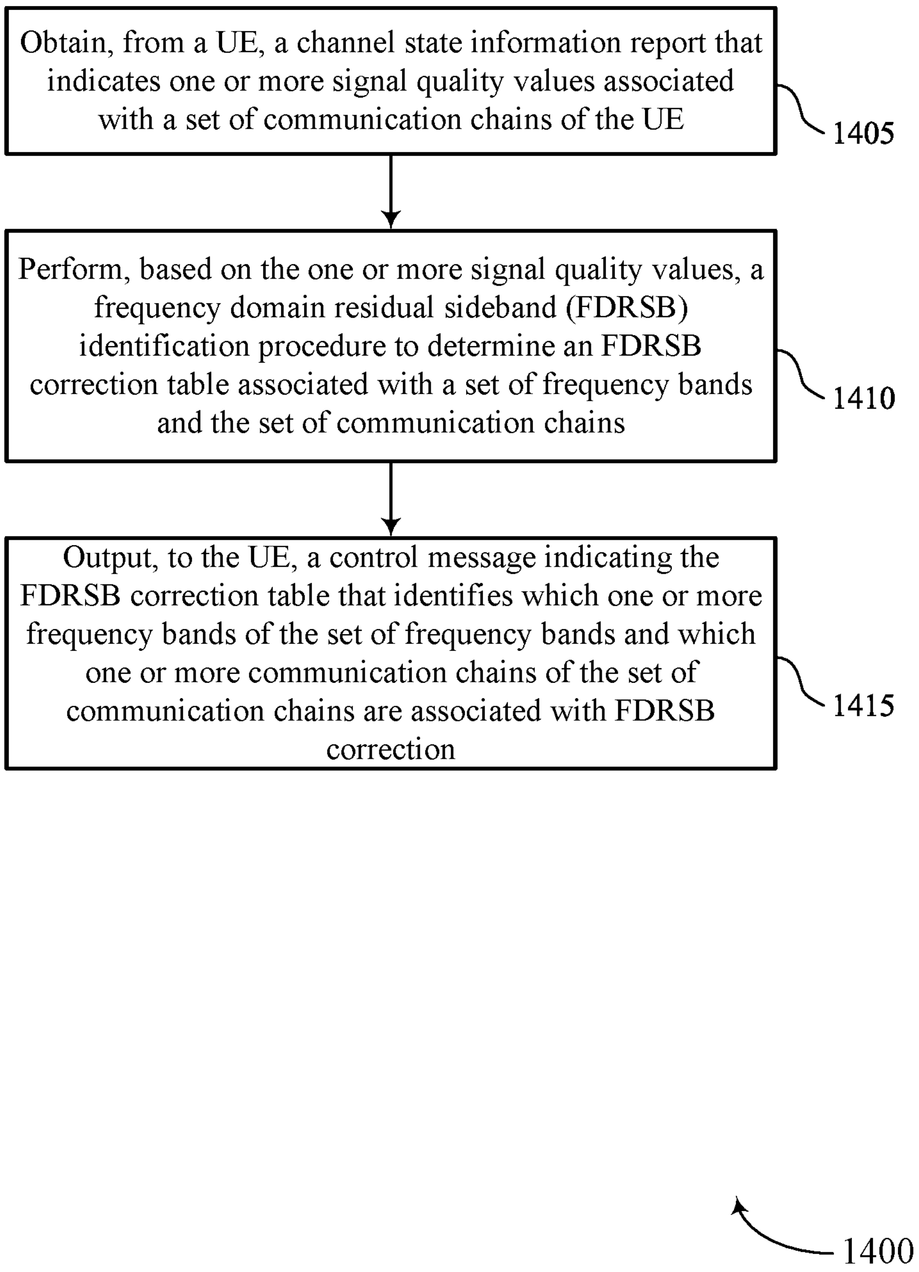
FIGS. 14 through 17 show flowcharts illustrating methods that support techniques for frequency band distortion correction in accordance with one or more aspects of the present disclosure.

FIG. 14 shows a flowchart illustrating a method 1400 that supports techniques for frequency band distortion correction in accordance with aspects of the present disclosure. The operations of the method 1400 may be implemented by a network entity or its components as described herein. For example, the operations of the method 1400 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1405, the method may include obtaining, from a UE, a CSI report that indicates one or more signal quality values associated with a set of communication chains of the UE. The operations of block 1405 may be performed in accordance with examples as disclosed herein. In some examples, aspects of the operations of 1405 may be performed by a message monitoring component 825 as described with reference to FIG. 8.

At 1410, the method may include performing, based on the one or more signal quality values, a FDRSB identification procedure to determine an FDRSB correction table associated with a set of frequency bands and the set of communication chains. The operations of block 1410 may be performed in accordance with examples as disclosed herein. In some examples, aspects of the operations of 1410 may be performed by a signal error identification component 830 as described with reference to FIG. 8.

At 1415, the method may include outputting, to the UE, a control message indicating the FDRSB correction table that identifies which one or more frequency bands of the set of frequency bands and which one or more communication chains of the set of communication chains are associated with FDRSB correction. The operations of block 1415 may be performed in accordance with examples as disclosed herein. In some examples, aspects of the operations of 1415 may be performed by a control signaling component 835 as described with reference to FIG. 8.

Figure 15:
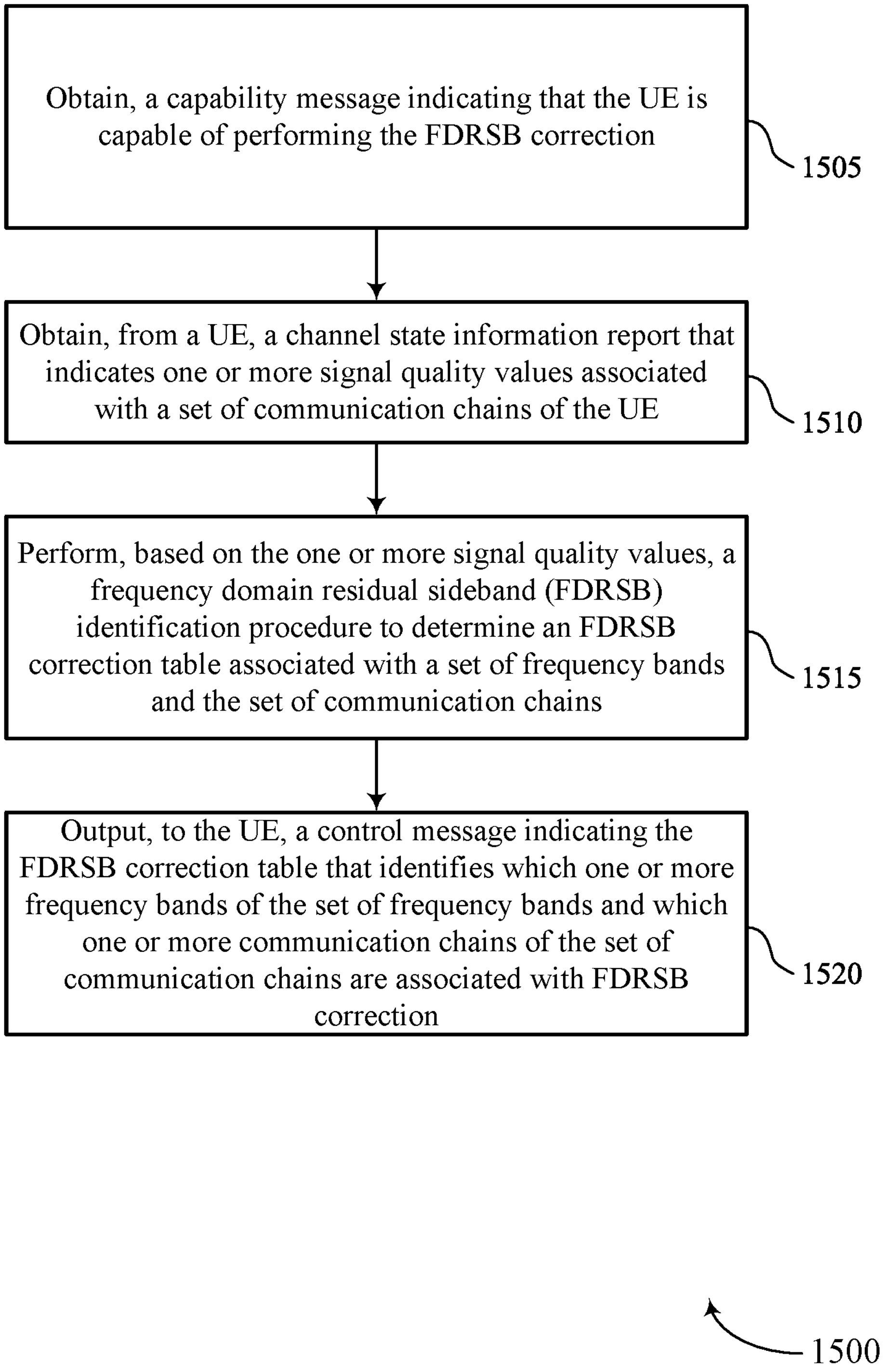

FIG. 15 shows a flowchart illustrating a method 1500 that supports techniques for frequency band distortion correction in accordance with aspects of the present disclosure. The operations of the method 1500 may be implemented by a network entity or its components as described herein. For example, the operations of the method 1500 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1505, the method may include obtaining, a capability message indicating that the UE is capable of performing the FDRSB correction, where the FDRSB identification procedure and the control message indicating the FDRSB correction table are based on the capability message. The operations of block 1505 may be performed in accordance with examples as disclosed herein. In some examples, aspects of the operations of 1505 may be performed by a message monitoring component 825 as described with reference to FIG. 8.

At 1510, the method may include obtaining, from a UE, a CSI report that indicates one or more signal quality values associated with a set of communication chains of the UE. The operations of block 1510 may be performed in accordance with examples as disclosed herein. In some examples, aspects of the operations of 1510 may be performed by a message monitoring component 825 as described with reference to FIG. 8.

At 1515, the method may include performing, based on the one or more signal quality values, a FDRSB identification procedure to determine an FDRSB correction table associated with a set of frequency bands and the set of communication chains. The operations of block 1515 may be performed in accordance with examples as disclosed herein. In some examples, aspects of the operations of 1515 may be performed by a signal error identification component 830 as described with reference to FIG. 8.

At 1520, the method may include outputting, to the UE, a control message indicating the FDRSB correction table that identifies which one or more frequency bands of the set of frequency bands and which one or more communication chains of the set of communication chains are associated with FDRSB correction. The operations of block 1520 may be performed in accordance with examples as disclosed herein. In some examples, aspects of the operations of 1520 may be performed by a control signaling component 835 as described with reference to FIG. 8.

Figure 16:
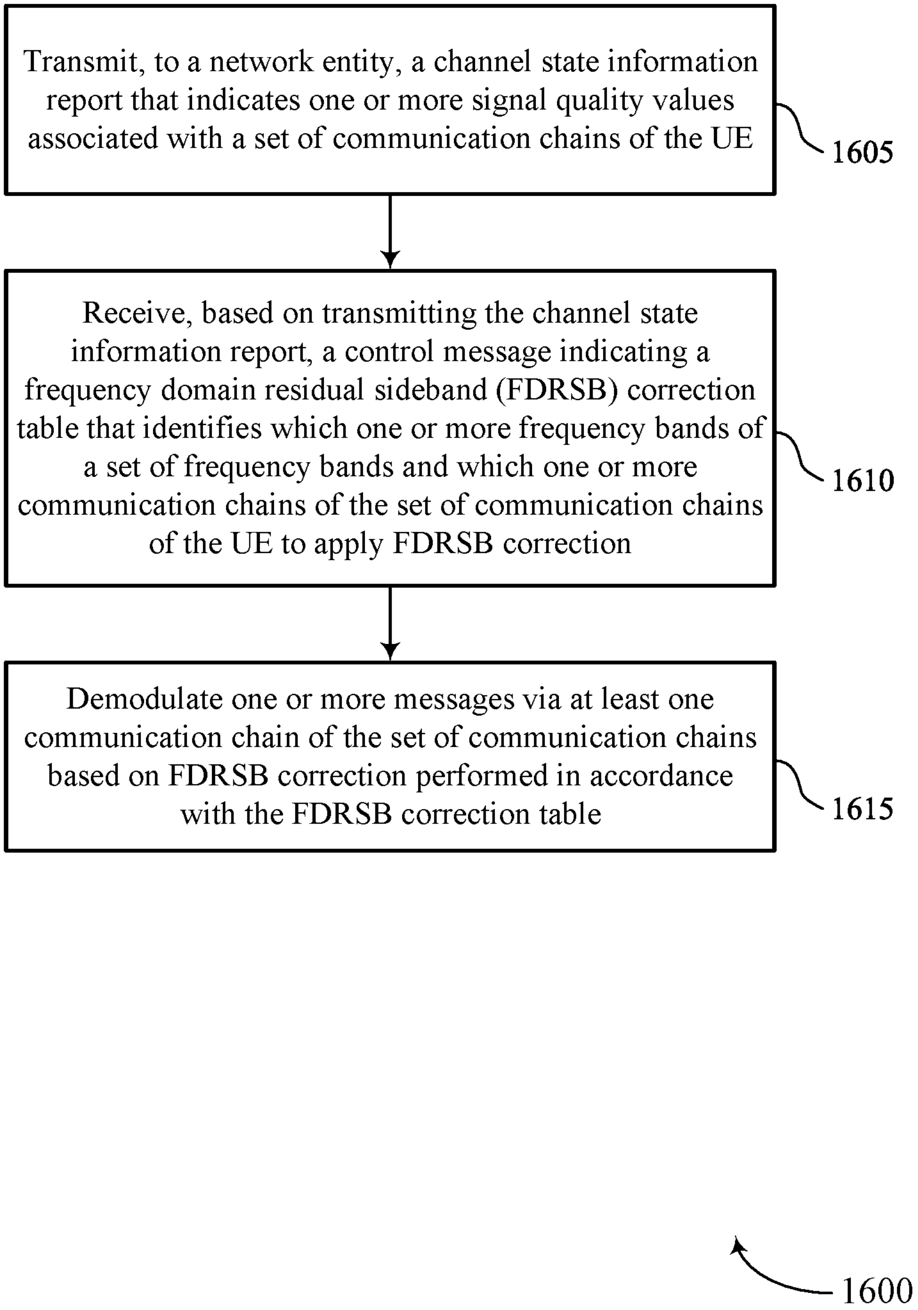

FIG. 16 shows a flowchart illustrating a method 1600 that supports techniques for frequency band distortion correction in accordance with aspects of the present disclosure. The operations of the method 1600 may be implemented by a UE or its components as described herein. For example, the operations of the method 1600 may be performed by a UE 115 as described with reference to FIGS. 1 through 5 and 10 through 13. In some examples, a UE may execute a set of instructions to control the functional elements of the UE to perform the described functions. Additionally, or alternatively, the UE may perform aspects of the described functions using special-purpose hardware.

At 1605, the method may include transmitting, to a network entity, a CSI report that indicates one or more signal quality values associated with a set of communication chains of the UE. The operations of block 1605 may be performed in accordance with examples as disclosed herein. In some examples, aspects of the operations of 1605 may be performed by a message signaling component 1225 as described with reference to FIG. 12.

At 1610, the method may include receiving, based on transmitting the CSI report, a control message indicating a FDRSB correction table that identifies which one or more frequency bands of a set of frequency bands and which one or more communication chains of the set of communication chains of the UE to apply FDRSB correction. The operations of block 1610 may be performed in accordance with examples as disclosed herein. In some examples, aspects of the operations of 1610 may be performed by a message monitoring component 1230 as described with reference to FIG. 12.

At 1615, the method may include demodulating one or more messages via at least one communication chain of the set of communication chains based on FDRSB correction performed in accordance with the FDRSB correction table. The operations of block 1615 may be performed in accordance with examples as disclosed herein. In some examples, aspects of the operations of 1615 may be performed by a demodulation component 1235 as described with reference to FIG. 12.

Figure 17:
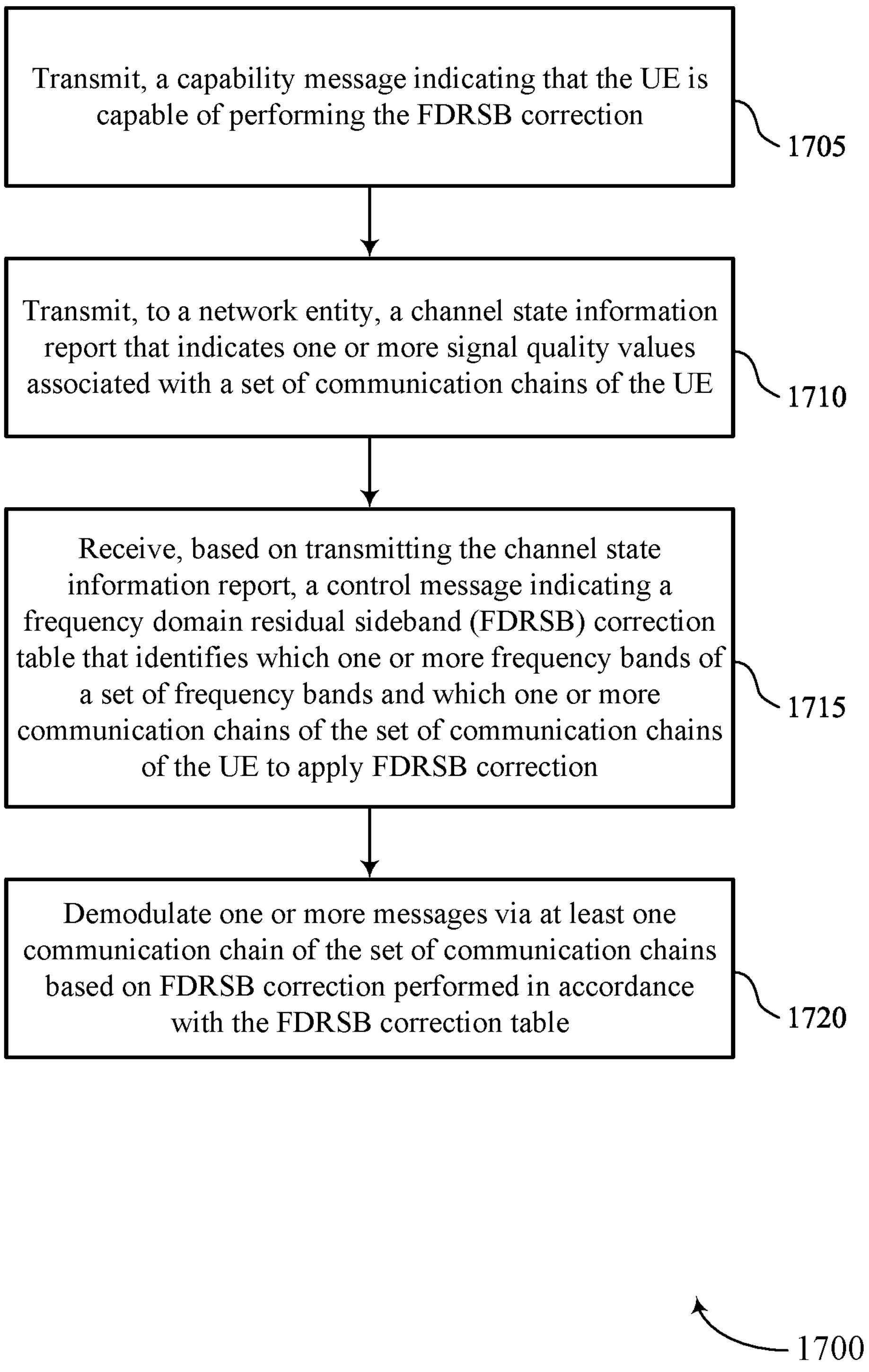

FIG. 17 shows a flowchart illustrating a method 1700 that supports techniques for frequency band distortion correction in accordance with aspects of the present disclosure. The operations of the method 1700 may be implemented by a UE or its components as described herein. For example, the operations of the method 1700 may be performed by a UE 115 as described with reference to FIGS. 1 through 5 and 10 through 13. In some examples, a UE may execute a set of instructions to control the functional elements of the UE to perform the described functions. Additionally, or alternatively, the UE may perform aspects of the described functions using special-purpose hardware.

At 1705, the method may include transmitting, a capability message indicating that the UE is capable of performing the FDRSB correction, where the control message indicating the FDRSB correction table is based on the capability message. The operations of block 1705 may be performed in accordance with examples as disclosed herein. In some examples, aspects of the operations of 1705 may be performed by a message signaling component 1225 as described with reference to FIG. 12.

At 1710, the method may include transmitting, to a network entity, a CSI report that indicates one or more signal quality values associated with a set of communication chains of the UE. The operations of block 1710 may be performed in accordance with examples as disclosed herein. In some examples, aspects of the operations of 1710 may be performed by a message signaling component 1225 as described with reference to FIG. 12.

At 1715, the method may include receiving, based on transmitting the CSI report, a control message indicating a FDRSB correction table that identifies which one or more frequency bands of a set of frequency bands and which one or more communication chains of the set of communication chains of the UE to apply FDRSB correction. The operations of block 1715 may be performed in accordance with examples as disclosed herein. In some examples, aspects of the operations of 1715 may be performed by a message monitoring component 1230 as described with reference to FIG. 12.

At 1720, the method may include demodulating one or more messages via at least one communication chain of the set of communication chains based on FDRSB correction performed in accordance with the FDRSB correction table. The operations of block 1720 may be performed in accordance with examples as disclosed herein. In some examples, aspects of the operations of 1720 may be performed by a demodulation component 1235 as described with reference to FIG. 12.

The following provides an overview of aspects of the present disclosure:

Aspect 1: A method for wireless communications, at a network entity, comprising: obtaining, from a UE, a CSI report that indicates one or more signal quality values associated with a set of communication chains of the UE; performing, based at least in part on the one or more signal quality values, a FDRSB identification procedure to determine an FDRSB correction table associated with a set of frequency bands and the set of communication chains; and outputting, to the UE, a control message indicating the FDRSB correction table that identifies which one or more frequency bands of the set of frequency bands and which one or more communication chains of the set of communication chains are associated with FDRSB correction.

Aspect 2: The method of aspect 1, further comprising: obtaining, a capability message indicating that the UE is capable of performing the FDRSB correction, wherein the FDRSB identification procedure and the control message indicating the FDRSB correction table are based at least in part on the capability message.

Aspect 3: The method of any of aspects 1 through 2, wherein the FDRSB identification procedure comprises: measuring an FDRSB distortion level across the set of frequency bands for the set of communication chains; and generating a respective FDRSB curve for each communication chain of the set of communication chains, wherein a given FDRSB curve comprises an FDRSB value for each frequency band across the set of frequency bands for an associated communication chain.

Aspect 4: The method of aspect 3, further comprising: determining a thermal noise level across the set of frequency bands for the set of communication chains based at least in part on the FDRSB distortion level and the one or more signal quality values.

Aspect 5: The method of aspect 4, further comprising: determining a first value for a thermal noise threshold based at least in part on the thermal noise level across the set of frequency bands and a noise attenuation value associated with the network entity; determining a second value for a MCS threshold associated with decoding data MCSs at the network entity; and determining an EVM threshold as a higher value between the first value and the second value.

Aspect 6: The method of aspect 5, wherein determining the FDRSB correction table in accordance with the EVM threshold and the respective FDRSB curve for each communication chain, wherein the FDRSB correction table comprises: a plurality of subsets of frequency bands that spans the set of frequency bands; and a respective indication of one or more communication chains of the set of communication chains for each subset of frequency bands, wherein the one or more communication chains indicated for a given subset of frequency bands is based at least in part on the FDRSB value associated with the one or more communication chains being greater than the EVM threshold for the given subset of frequency bands.

Aspect 7: The method of any of aspects 1 through 6, wherein the one or more signal quality values associated with the set of frequency bands comprises a current SNR value at the UE associated with the set of communication chains.

Aspect 8: The method of any of aspects 1 through 7, wherein the control message indicating the FDRSB correction table is a PDCCH message.

Aspect 9: A method for wireless communications, at a UE, comprising: transmitting, to a network entity, a CSI report that indicates one or more signal quality values associated with a set of communication chains of the UE; receiving, based at least in part on transmitting the CSI report, a control message indicating a FDRSB correction table that identifies which one or more frequency bands of a set of frequency bands and which one or more communication chains of the set of communication chains of the UE to apply FDRSB correction; and demodulating one or more messages via at least one communication chain of the set of communication chains based at least in part on FDRSB correction performed in accordance with the FDRSB correction table.

Aspect 10: The method of aspect 9, further comprising: transmitting, a capability message indicating that the UE is capable of performing the FDRSB correction, wherein the control message indicating the FDRSB correction table is based at least in part on the capability message.

Aspect 11: The method of any of aspects 9 through 10, wherein the FDRSB correction table comprises; an indication of a plurality of subsets of frequency bands that spans the set of frequency bands; and a respective indication of one or more communication chains of the set of communication chains for each subset of frequency bands.

Aspect 12: The method of aspect 11, wherein performing the FDRSB correction comprises: estimating a respective FDRSB level for each of the one or more communication chains indicated for each subset of frequency bands of the plurality of subsets of the frequency bands; and removing the estimated respective FDRSB level for each of the one or more communication chains indicated for each subset of frequency bands of the plurality of subsets of the frequency bands.

Aspect 13: The method of any of aspects 9 through 12, wherein the one or more signal quality values associated with the set of frequency bands comprises a current SNR value at the UE associated with the set of communication chains.

Aspect 14: The method of any of aspects 9 through 13, wherein the control message indicating the FDRSB correction table is a PDCCH message.

Aspect 15: A network entity for wireless communications, comprising one or more memories storing processor-executable code, and one or more processors coupled with the one or more memories and individually or collectively operable to execute the code to cause the network entity to perform a method of any of aspects 1 through 8.

Aspect 16: A network entity for wireless communications, comprising at least one means for performing a method of any of aspects 1 through 8.

Aspect 17: A non-transitory computer-readable medium storing code for wireless communications, the code comprising instructions executable by one or more processors to perform a method of any of aspects 1 through 8.

Aspect 18: A UE for wireless communications, comprising one or more memories storing processor-executable code, and one or more processors coupled with the one or more memories and individually or collectively operable to execute the code to cause the UE to perform a method of any of aspects 9 through 14.

Aspect 19: A UE for wireless communications, comprising at least one means for performing a method of any of aspects 9 through 14.

Aspect 20: A non-transitory computer-readable medium storing code for wireless communications, the code comprising instructions executable by one or more processors to perform a method of any of aspects 9 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components." Additionally, a "set" as used herein may refer to one or more.

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A network entity, comprising:

one or more memories storing processor-executable code; and one or more processors coupled with the one or more memories and individually or collectively operable to execute the code to cause the network entity to:

obtain, from a user equipment (UE), a channel state information report that indicates one or more signal quality values associated with a set of communication chains of the UE;

perform, based at least in part on the one or more signal quality values, a frequency domain residual sideband (FDRSB) identification procedure to determine an FDRSB correction table associated with a set of frequency bands and the set of communication chains; and output, to the UE, a control message indicating the FDRSB correction table that identifies which one or more frequency bands of the set of frequency bands and which one or more communication chains of the set of communication chains are associated with FDRSB correction.

2. The network entity of claim 1, wherein the one or more processors are individually or collectively further operable to execute the code to cause the network entity to:

obtain, a capability message indicating that the UE is capable of performing the FDRSB correction, wherein the FDRSB identification procedure and the control message indicating the FDRSB correction table are based at least in part on the capability message.

3. The network entity of claim 1, wherein, to perform FDRSB identification procedure, the one or more processors are individually or collectively operable to execute the code to cause the network entity to:

measure an FDRSB distortion level across the set of frequency bands for the set of communication chains; and generate a respective FDRSB curve for each communication chain of the set of communication chains, wherein a given FDRSB curve comprises an FDRSB value for each frequency band across the set of frequency bands for an associated communication chain.

4. The network entity of claim 3, wherein the one or more processors are individually or collectively further operable to execute the code to cause the network entity to:

determine a thermal noise level across the set of frequency bands for the set of communication chains based at least in part on the FDRSB distortion level and the one or more signal quality values.

5. The network entity of claim 4, wherein the one or more processors are individually or collectively further operable to execute the code to cause the network entity to:

determine a first value for a thermal noise threshold based at least in part on the thermal noise level across the set of frequency bands and a noise attenuation value associated with the network entity;

determine a second value for a modulation and coding scheme threshold associated with decoding data modulation and coding schemes at the network entity; and determine an error vector magnitude threshold as a higher value between the first value and the second value.

6. The network entity of claim 5, wherein the one or more processors are individually or collectively further operable to execute the code to cause the network entity to:

determine the FDRSB correction table in accordance with the error vector magnitude threshold and the respective FDRSB curve for each communication chain, wherein the FDRSB correction table comprises:

a plurality of subsets of frequency bands that spans the set of frequency bands; and a respective indication of one or more communication chains of the set of communication chains for each subset of frequency bands, wherein the one or more communication chains indicated for a given subset of frequency bands is based at least in part on the FDRSB value associated with the one or more communication chains being greater than the error vector magnitude threshold for the given subset of frequency bands.

7. The network entity of claim 1, wherein the one or more signal quality values associated with the set of frequency bands comprises a current signal-to-noise ratio value at the UE associated with the set of communication chains.

8. The network entity of claim 1, wherein the control message indicating the FDRSB correction table is a physical downlink control channel message.

9. A user equipment (UE), comprising:

one or more memories storing processor-executable code; and one or more processors coupled with the one or more memories and individually or collectively operable to execute the code to cause the UE to:

wirelessly transmit, to a network entity, a channel state information report that indicates one or more signal quality values associated with a set of communication chains of the UE;

wirelessly receive, based at least in part on transmitting the channel state information report, a control message indicating a frequency domain residual sideband (FDRSB) correction table that identifies which one or more frequency bands of a set of frequency bands and which one or more communication chains of the set of communication chains of the UE to apply FDRSB correction; and demodulate one or more messages via at least one communication chain of the set of communication chains based at least in part on FDRSB correction performed in accordance with the FDRSB correction table.

10. The UE of claim 9, wherein the one or more processors are individually or collectively further operable to execute the code to cause the UE to:

wirelessly transmit, a capability message indicating that the UE is capable of performing the FDRSB correction, wherein the control message indicating the FDRSB correction table is based at least in part on the capability message.

11. The UE of claim 9, wherein the FDRSB correction table comprises:

an indication of a plurality of subsets of frequency bands that spans the set of frequency bands; and a respective indication of one or more communication chains of the set of communication chains for each subset of frequency bands.

12. The UE of claim 11, wherein, to perform the FDRSB correction, the one or more processors are individually or collectively operable to execute the code to cause the UE to:

estimate a respective FDRSB level for each of the one or more communication chains indicated for each subset of frequency bands of the plurality of subsets of the frequency bands; and remove the estimated respective FDRSB level for each of the one or more communication chains indicated for each subset of frequency bands of the plurality of subsets of the frequency bands.

13. The UE of claim 9, wherein the one or more signal quality values associated with the set of frequency bands comprises a current signal-to-noise ratio value at the UE associated with the set of communication chains.

14. The UE of claim 9, wherein the control message indicating the FDRSB correction table is a physical downlink control channel message.

15. A method for wireless communications, at a network entity, comprising:

obtaining, from a user equipment (UE), a channel state information report that indicates one or more signal quality values associated with a set of communication chains of the UE;

performing, based at least in part on the one or more signal quality values, a frequency domain residual sideband (FDRSB) identification procedure to determine an FDRSB correction table associated with a set of frequency bands and the set of communication chains; and outputting, to the UE, a control message indicating the FDRSB correction table that identifies which one or more frequency bands of the set of frequency bands and which one or more communication chains of the set of communication chains are associated with FDRSB correction.

16. The method of claim 15, further comprising:

obtaining, a capability message indicating that the UE is capable of performing the FDRSB correction, wherein the FDRSB identification procedure and the control message indicating the FDRSB correction table are based at least in part on the capability message.

17. The method of claim 15, wherein the FDRSB identification procedure comprises:

measuring an FDRSB distortion level across the set of frequency bands for the set of communication chains; and generating a respective FDRSB curve for each communication chain of the set of communication chains, wherein a given FDRSB curve comprises an FDRSB value for each frequency band across the set of frequency bands for an associated communication chain.

18. The method of claim 17, further comprising:

determining a thermal noise level across the set of frequency bands for the set of communication chains based at least in part on the FDRSB distortion level and the one or more signal quality values.

19. The method of claim 18, further comprising:

determining a first value for a thermal noise threshold based at least in part on the thermal noise level across the set of frequency bands and a noise attenuation value associated with the network entity;

determining a second value for a modulation and coding scheme threshold associated with decoding data modulation and coding schemes at the network entity; and determining an error vector magnitude threshold as a higher value between the first value and the second value.

20. The method of claim 19, further comprising:

determining the FDRSB correction table in accordance with the error vector magnitude threshold and the respective FDRSB curve for each communication chain, wherein the FDRSB correction table comprises:

a plurality of subsets of frequency bands that spans the set of frequency bands; and a respective indication of one or more communication chains of the set of communication chains for each subset of frequency bands, wherein the one or more communication chains indicated for a given subset of frequency bands is based at least in part on the FDRSB value associated with the one or more communication chains being greater than the error vector magnitude threshold for the given subset of frequency bands.

* * * * *